(12) United States Patent
Kim et al.

(10) Patent No.: US 12,353,663 B2
(45) Date of Patent: Jul. 8, 2025

(54) ELECTRONIC DEVICE

(71) Applicant: SAMSUNG DISPLAY CO., LTD., Yongin-si (KR)

(72) Inventors: Hyungbae Kim, Yongin-si (KR); Sanghyun Lim, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 18/774,129

(22) Filed: Jul. 16, 2024

(65) Prior Publication Data

US 2025/0053262 A1  Feb. 13, 2025

(30) Foreign Application Priority Data

Aug. 8, 2023 (KR) .......... 10-2023-0103477

(51) Int. Cl.
  G06F 3/041 (2006.01)
  G06F 3/044 (2006.01)
  G09G 3/32 (2016.01)

(52) U.S. Cl.
  CPC ...... *G06F 3/04182* (2019.05); *G06F 3/04164* (2019.05); *G06F 3/0446* (2019.05); *G09G 3/32* (2013.01); *G09G 2310/0275* (2013.01); *G09G 2310/08* (2013.01)

(58) Field of Classification Search
  None
  See application file for complete search history.

(56) References Cited

U.S. PATENT DOCUMENTS

| | | |
|---|---|---|
| 10,444,901 B2 | 10/2019 | Shin |
| 10,969,911 B2 | 4/2021 | Kim et al. |
| 11,216,114 B2 | 1/2022 | Han |
| 11,656,729 B2 | 5/2023 | Park et al. |
| 2017/0147143 A1* | 5/2017 | Jung .................. G06F 3/0412 |
| 2020/0350389 A1* | 11/2020 | Lee ..................... G09G 5/18 |
| 2022/0137743 A1* | 5/2022 | Lim ................... G09G 3/3266 |
| | | 345/174 |
| 2023/0114167 A1 | 4/2023 | Oh et al. |
| 2023/0127696 A1 | 4/2023 | Zheng et al. |

FOREIGN PATENT DOCUMENTS

| | | |
|---|---|---|
| KR | 10-1903419 | 10/2018 |
| KR | 10-2122527 | 6/2020 |
| KR | 10-2021-0081584 | 7/2021 |
| KR | 10-2021-0153392 | 12/2021 |
| KR | 10-2022-0112574 | 8/2022 |
| KR | 10-2023-0023034 | 2/2023 |
| KR | 10-2533513 | 5/2023 |

\* cited by examiner

*Primary Examiner* — Krishna P Neupane
(74) *Attorney, Agent, or Firm* — F. CHAU & ASSOCIATES, LLC

(57) ABSTRACT

An electronic device includes a host processor to output a first signal having a first frequency and a second signal having a second frequency higher than the first frequency and containing frame data, a driving controller configured to receive the frame data from the host processor and to generate image data, a display layer to display an image based on the image data, a sensor layer disposed on the display layer and including a plurality of sensing electrodes, and a sensor driver to provide a transmit signal having a third frequency to the plurality of sensing electrodes. The host processor determines the first frequency based on the third frequency.

25 Claims, 21 Drawing Sheets

ELECTRONIC DEVICE

CROSS-REFERENCE TO RELATED APPLICATION

This application claims priority under 35 U.S.C. § 119 to Korean Patent Application No. 10-2023-0103477 filed on Aug. 8, 2023, in the Korean Intellectual Property Office, the disclosure of which is incorporated by reference herein in its entirety.

TECHNICAL FIELD

Embodiments of the present disclosure described herein relate to an electronic device having improved sensing reliability.

DISCUSSION OF RELATED ART

Multimedia electronic devices, such as a television, a cellular phone, a tablet computer, a navigation device, or a game console, include a display device to display an image. Electronic devices may include a sensor layer to provide a touch-based input scheme allowing a user to easily, intuitively, or conveniently input information or a command in addition/alternative to a traditional input scheme such as a button, a keyboard, or a mouse. The sensor layer may sense the touch state of a physical body of the user.

SUMMARY

Embodiments of the present disclosure provide an electronic device with improved touch sensing reliability.

According to an embodiment, an electronic device may include a host processor to output a first signal having a first frequency and a second signal having a second frequency higher than the first frequency and containing frame data, a driving controller configured to receive the frame data from the host processor and to generate image data based on the frame data, a display layer to display an image based on the image data, a sensor layer disposed on the display layer and including a plurality of sensing electrodes, and a sensor driver to provide a transmit signal having a third frequency to the plurality of sensing electrodes. The host processor determines the first frequency based on the third frequency.

The third frequency may be an integer multiple of the first frequency.

The transmit signal may include a first transmit period having a first level and a second transmit period subsequent to the first transmit period and having a second level lower than the first level, and the first signal may include a first period having a third level and a second period subsequent to the first period and having a fourth level lower than the third level.

A width of the first transmit period and a width of the second transmit period may be wider than a width of the first period.

The first transmit period may overlap the first period.
The second transmit period may overlap the first period.
The fourth frequency may be equal to the third frequency.
The first frequency may be higher than the third frequency.

A width of the first transmit period and a width of the second transmit period may be narrower than a width of the first period.

A plurality of first transmit periods are provided, and two first transmit periods, which are subsequent to each other while interposing the second transmit period between the two first transmit periods, and the second transmit period may overlap the first period.

A rising time point of the first period may overlap one of the two first transmit periods and a falling time point of the first period may overlap a remaining one of the two first transmit periods.

The first frequency may be lower than the third frequency.

The electronic device may further include a connector electrically connecting the host processor to the display layer, and a first communication line electrically connected between the sensor driver and the connector to transmit driving information of the sensor layer.

The electronic device may further include a data driver electrically connected to the display layer and a second communication line electrically connected between the sensor driver and the data driver to transmit driving information of the sensor layer.

The electronic device may further include a display signal line electrically connected to the display layer and the host processor to transmit or receive the first signal and the second signal and a sensor signal line electrically connected between the sensor layer and the sensor driver to transmit or receive the transmit signal. The display signal line and the sensor signal line overlap each other when viewed in a plan view.

According to an embodiment of the present disclosure, an electronic device may include a host processor to output a first signal having a first frequency and a second signal having a second frequency higher than the first frequency and containing frame data, a driving controller connected to the host processor to receive the frame data from the host processor and to generate image data, a display layer to display an image based on the image data, a sensor layer disposed on the display layer and including a plurality of sensing electrodes, and a sensor driver to provide a transmit signal having a third frequency to the plurality of sensing electrodes. The host processor measures noise in the receive signal by sweeping a packet frequency over a range of packet frequencies, and driving the sensor layer, and selects, as the first frequency, one of a plurality of candidate frequencies at which the measured noise is less than or equal to a predetermined threshold.

The host processor may include a memory to store a value of the measured noise for the each of the packet frequencies.

The noise having the predetermined threshold strength is preset based on an erroneous operation of the sensor layer.

The host processor may output the first signal having the first frequency selected.

The host processor may re-measure the noise for each of the packet frequencies, when the sensor driver is reset.

According to an embodiment of the present disclosure, an electronic device may include a host processor to output a first signal having a first frequency and a second signal having a second frequency higher than the first frequency and containing frame data, a driving controller connected to the host processor to receive the frame data from the host processor and to generate image data, a display layer to display an image based on the image data, a sensor layer disposed on the display layer and including a plurality of sensing electrodes, and a sensor driver to provide a transmit signal having a third frequency to the plurality of sensing electrodes and receives a receive signal from the plurality of sensing electrodes. An active period of the transmit signal completely overlaps an active period of the first signal.

A width of the active period of the transmit signal may be wider than a width of the active period of the first signal.

The first frequency may be equal to or higher than the third frequency.

The electronic device may further include a connector electrically connecting the host processor to the display layer and a first communication line electrically connected between the sensor driver and the connector to transmit driving information of the sensor layer.

The electronic device may further include a second communication line electrically connected between the sensor driver and the data driver to transmit driving information of the sensor layer.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
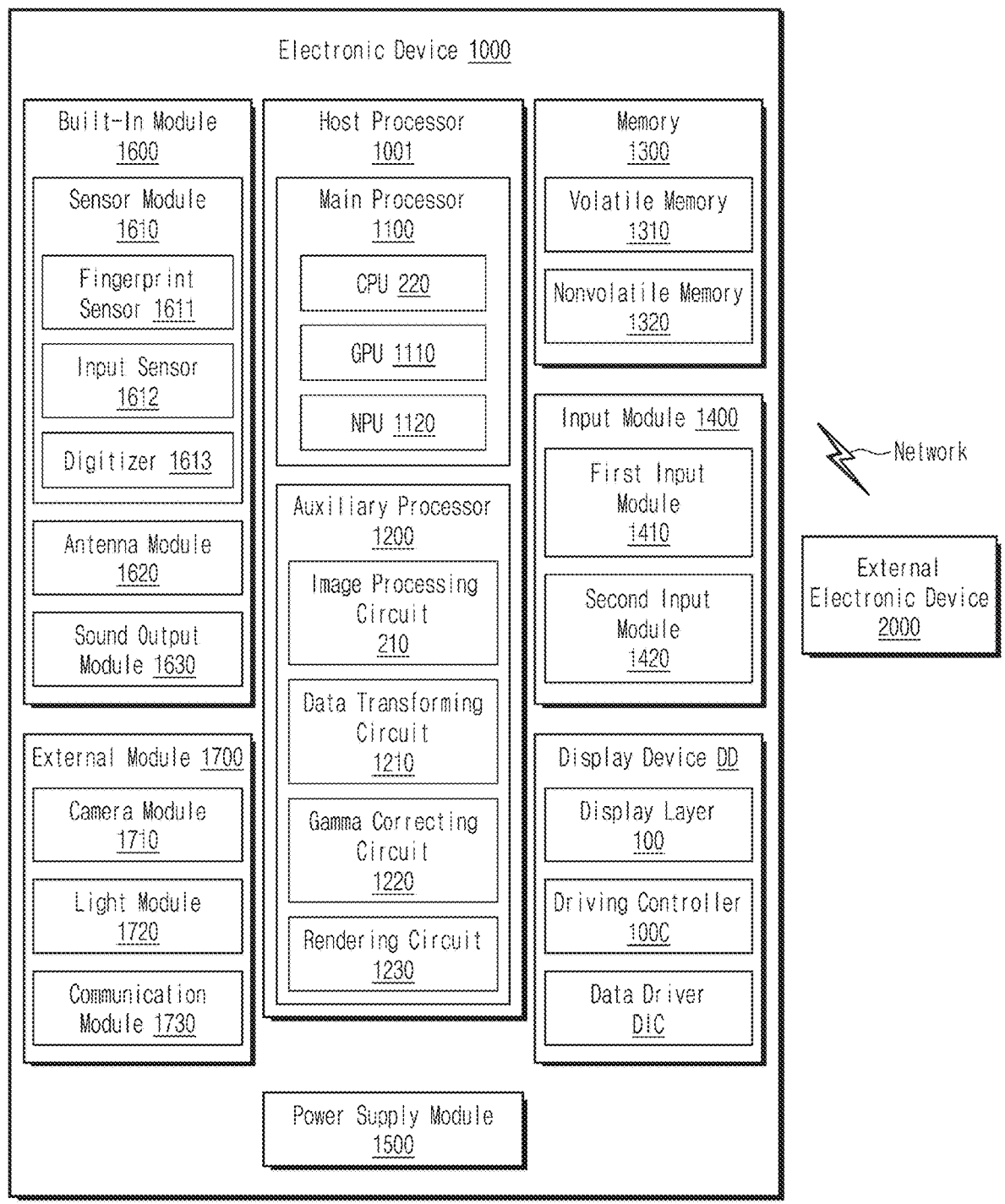
FIG. 1 is a block diagram of an electronic device according to an embodiment of the present disclosure.

In the specification, the expression that a first component (or region, layer, part, portion, etc.) is "on", "connected to", or "coupled to" a second component means that the first component is directly on, connected to, or coupled to the second component in some embodiments or that a third component is interposed therebetween in other embodiments.

The same reference numeral will be assigned to the same component. In addition, in drawings, thicknesses, proportions, and dimensions of components may be exaggerated to describe the technical features effectively. The term "and/or" includes any and all combinations of one or more of associated components.

Although the terms "first", "second", etc. may be used to describe various components, the components should not be construed as being limited by the terms. The terms are only used to distinguish one component from another component. For example, without departing from the scope and spirit of the inventive concept, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to the drawings.

FIG. 1 is a block diagram of an electronic device according to an embodiment of the present disclosure.

Referring to FIG. 1, an electronic device 1000 may output various types of information through a display device DD under the operating system. When a host processor 1001 executes an application stored in a memory 1300, the display device DD may provide application information to the user through a display layer 100.

The host processor 1001 may obtain an external input through an input module 1400 or a sensor module 1610 and execute an application corresponding to the external input. For example, when a user selects a camera icon displayed on the display layer 100, the host processor 1001 may obtain a user input through an input sensor 1612 and activate a camera module 1710. The host processor 1001 may transfer frame data corresponding to the photographed image acquired through the camera module 1710 to the display device DD. The display device DD may display an image corresponding to the photographed image through the display layer 100.

As another example, when personal information authentication is performed in the display device DD, a fingerprint sensor 1611 may obtain input fingerprint information as input data. The host processor 1001 may compare input data obtained through the fingerprint sensor 1611 with authentication data stored in the memory 1300 and execute an application according to the comparison result. The display device DD may display information executed according to the logic of the application through the display layer 100.

For example, when a music streaming icon displayed on the display device DD is selected, the host processor 1001 may obtain a user input through the input sensor 1612 and activate a music streaming application stored in the memory 1300. When a music execution command is input in a music streaming application, the host processor 1001 may activate a sound output module 1630 to provide sound information corresponding to the music execution command to the user.

As described above, example operations of the electronic device 1000 have been briefly described. Hereinafter, the configuration of the electronic device 1000 will be described in detail. Some of the components of the electronic device 1000 to be described later may be integrated and provided in the form of one component; however, one component may be provided separately into two or more components.

The electronic device 1000 may communicate with an external electronic device 2000 over a network (e.g., a short-range wireless communication network or a long-distance wireless communication network). According to an embodiment, the electronic device 1000 may include the host processor 1001, the memory 1300, the input module 1400, the display device DD, a power supply module 1500, a built-in module 1600, and an external module 1700. According to an embodiment, at least one of the above-described components may be omitted or one or more different components may be added to the electronic device 1000. According to an embodiment, some of the components (e.g., the sensor module 1610, an antenna module 1620, or the sound output module 1630) may be integrated into another component (e.g., the display device DD).

The host processor 1001 may execute software to control at least one different component (e.g., hardware or software component) of the electronic device 1000 connected to the host processor 1001 and may perform various data processing or operations. According to an embodiment, as at least a portion of data processing or operation, the host processor 1001 may store commands or data received from different components (e.g., the input module 1400, the sensor module 1610, or a communication module 1730) in a volatile memory 1310, process commands or data stored in the volatile memory 1310, and store result data in a nonvolatile memory 1320.

The host processor 1001 may include a main processor 1100 and an auxiliary processor 1200. The main processor 1100 may include at least one of a central processing unit (CPU) or an application processor. The main processor 1100 may further include at least one of a graphic processing unit (GPU), a communication processor (CP), or an image signal processor (ISP). The main processor 1100 may further include a neural processing unit (NPU) 1120. The neural processing unit is a processor specialized for processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a current neural network (RNN), a restricted boltzmann machine (RBM), a deep trust network (DBN), a bidirectional current deep neural network (BRDNN), a deep Q-network (deep Q-network), or a combination of two or more above, but is not limited to the above examples. In addition to the above hardware structure, the artificial intelligence model may additionally or alternatively include a software structure. At least two of the above-described processing units and processors may be implemented as one integrated component (e.g., a single chip), or each of the above-described processing units and processors may be implemented as an independent component (e.g., multiple chips).

The auxiliary processor 1200 may include an image processing circuit 210, a data transforming circuit 1210, a gamma correcting circuit 1220, and a rendering circuit 1230.

The image processing circuit 210 may transform a data format of image data and output the transformed data format.

The data transforming circuit 1210 may receive frame data from a driving controller 100C, compensate the frame data so that an image is displayed at a desired brightness based on the characteristics of the electronic device 1000 or a user setting, or transform the frame data to reduce power consumption or to compensate for an afterimage. The gamma correcting circuit 1220 may transform the frame data or a gamma reference voltage such that an image displayed on the electronic device 1000 has a desired gamma characteristic. The rendering circuit 1230 may receive the frame data from the driving controller 100C and render the frame data based on the pixel arrangement of the display layer 100 applied to the electronic device 1000. At least one of the data transforming circuit 1210, the gamma correcting circuit 1220, or the rendering circuit 1230 may be integrated into a different component (e.g., the main processor 1100 or the driving controller 100C). At least one of the data transforming circuit 1210, the gamma correcting circuit 1220, or the rendering circuit 1230 may be integrated into a data driver DIC to be described later.

The memory 1300 may store various data used by at least one component (e.g., the host processor 1001 or sensor module 1610) of the electronic device 1000 and input data or output data for relevant commands. The memory 1300 may include at least one of the volatile memory 1310 or the nonvolatile memory 1320.

The input module 1400 may receive a command or data which is to be used in a component (e.g., the host processor 1001, the sensor module 1610, or the sound output module 1630) of the electronic device 1000, from the outside (e.g., a user or the external electronic device 2000).

The input module 1400 may include a first input module 1410 allowing a user to input a command or data and a second input module 1420 allowing the external electronic device 2000 to input a command or data. The first input module 1410 may include a microphone, a mouse, a keyboard (e.g., a button), or a pen (e.g., a passive pen or an active pen). The second input module 1420 may support a designated protocol which may be connected to the external electronic device 2000 in a wired or wireless manner. According to an embodiment, the second input module 1420 may include a high definition multimedia interface HDMI, a universal serial bus USB interface, an SD card interface, or an audio interface. The second input module 1420 may include a connector which may be physically connected to the external electronic device 2000, for example, an HDMI connector, a USB connector, an SD card connector, or an audio connector (e.g., a headphone connector).

The display device DD may visually provide information to a user. The display device DD may include the display layer 100, the driving controller 100C, and the data driver DIC. The display device DD may further include a window, a chassis, a bracket, etc. for protecting the display layer 100. The display device DD may further include a light emitting driving circuit and a voltage generator. The display device DD will be described later.

The power supply module 1500 may supply power to components of the electronic device 1000. The power supply module 1500 may include a battery which charges a power voltage. The battery may include a non-rechargeable primary battery, a rechargeable secondary battery, or a fuel cell. The power supply module 1500 may include a power management integrated circuit (PMIC). The PMIC may supply optimized power to each of the above-described modules and modules to be described later. The PMIC may supply optimized power to each of the above-described components and components to be described later. The power supply module 1500 may include a wireless power transmit/receive member electrically connected to a battery. The wireless power transmit/receive member may include a plurality of antenna radiators in the form of a coil.

The electronic device 1000 may further include the built-in module 1600 and the external module 1700. The built-in module 1600 may include the sensor module 1610, the antenna module 1620, and the sound output module 1630. The external module 1700 may include the camera module 1710, a light module 1720, and the communication module 1730.

The sensor module 1610 may detect an input by a user body or an input by a pen of the first input module 1410, and generate an electrical signal or data value corresponding to the input. The sensor module 1610 may include at least one of the fingerprint sensor 1611, the input sensor 1612, or a digitizer 1613.

The fingerprint sensor 1611 may generate a data value corresponding to a user fingerprint. The fingerprint sensor 1611 may include a fingerprint sensor in any one of an ultrasonic type, an optical type, and a capacitive type.

The input sensor 1612 may generate a data value corresponding to coordinate information of an input by a user body or an input by a pen. The amount of change in capacitance due to the input of the input sensor 1612 may be generated as a data value. The input sensor 1612 may detect an input by a passive pen or may transmit and receive data to and from the active pen.

The input sensor 1612 may measure a bio-signal such as blood pressure, moisture, or body fat. For example, when the user touches a part of the body on the sensor layer or the sensing panel and does not move for a specific time, the input sensor 1612 may sense the bio-signal and output the information desired by the user to the display device DD based on the change in the electric field caused by the body part.

The digitizer 1613 may generate a data value corresponding to coordinate information of an input by a pen. The digitizer 1613 may generate an electromagnetic change amount resulting from the input as a data value. The digitizer 1613 may sense an input by a passive pen or may transmit and receive data to and from the active pen.

At least one of the fingerprint sensor 1611, the input sensor 1612, or the digitizer 1613 may be implemented as sensor layers formed on the display layer 100 through subsequent processes. The fingerprint sensor 1611, the input sensor 1612, and the digitizer 1613 may be disposed over the display layer 100, and any one (for example, the digitizer 1613) of the fingerprint sensor 1611, the input sensor 1612, and the digitizer 1613 may be disposed under the display layer 100.

At least two of the fingerprint sensor 1611, the input sensor 1612, or the digitizer 1613 may be integrated into one sensing panel through the same process. When integrated into one sensing panel, the sensing panel may be disposed between the display layer 100 and a window disposed above the display layer 100. According to an embodiment, the sensing panel may be disposed on a window, and the position of the sensing panel is not particularly limited.

At least one of the fingerprint sensor 1611, the input sensor 1612, or the digitizer 1613 may be embedded in the display layer 100. In other words, at least one of the fingerprint sensor 1611, the input sensor 1612, or the digitizer 1613 may be simultaneously formed through a process for forming elements (e.g., light emitting elements, transistors) included in the display layer 100.

In addition, the sensor module 1610 may generate an electrical signal or data value corresponding to an internal state or an external state of the electronic device 1000. The sensor module 1610 may further include, for example, a gesture sensor, a gyro sensor, an atmospheric pressure sensor, a magnetic sensor, an acceleration sensor, a grip sensor, a proximity sensor, a color sensor, an IR (infrared) sensor, a biological sensor, a temperature sensor, a humidity sensor, or an illuminance sensor.

The antenna module 1620 may include at least one antenna to transmit or receive a signal or power from the outside. According to an embodiment, the communication module 1730 may transmit a signal to the external electronic device 2000 through an antenna suitable for a communication method or receive the signal from the external electronic device 2000. The antenna pattern of the antenna module 1620 may be integrated into one component (e.g., the display layer 100) of the display device DD or the input sensor 1612.

The sound output module 1630 is a device for outputting a sound signal to the outside of the electronic device 1000 and may include a speaker used for general purposes such as multimedia playback or recording playback and a receiver used exclusively for phone reception. According to an embodiment, the receiver may be formed integrally or separately from the speaker. The sound output pattern of the sound output module 1630 may be integrated with the display device DD.

The camera module 1710 may capture a still image and a moving image. According to an embodiment, the camera module 1710 may include at least one of a lens, an image sensor, or an image signal processor. The camera module 1710 may further include an infrared camera to measure the presence or absence of a user, a position of the user, and a gaze of the user.

The light module 1720 may provide light. The light module 1720 may include a light emitting diode or a xenon lamp. The light module 1720 may operate in link to the camera module 1710 or may operate independently.

The communication module 1730 may support establishing a wired or wireless communication channel between the electronic device 1000 and the external electronic device 2000 and making communication through the established communication channel. The communication module 1730 may include one or all of a wireless communication module such as a cellular communication module, a short-range wireless communication module, or a global navigation satellite system (GNSS) communication module and a wired communication module such as a local area network (LAN) communication module or a power line communication module. The communication module 1730 may communicate with the external electronic device 2000 through a short-range communication network, such as Bluetooth, WiFi direct, or IrDA (infrared data association), or a long-distance communication network such as a cellular network, the Internet, or a computer network (e.g., LAN or WAN). The above-described various types of communication modules 1730 may be implemented in the form of a single chip or may be implemented in the form of separate chips.

The input module 1400, the sensor module 1610, and the camera module 1710 may be utilized to control the operation of the display device DD in link to the host processor 1001.

The host processor 1001 may output a command or data to the display device DD, the sound output module 1630, the camera module 1710, or the light module 1720 based on the input data received from the input module 1400. For example, the host processor 1001 may generate frame data in response to input data, which is applied through a mouse or active pen, and output the frame data to the display device DD, or may generate command data in response to input data and output the command data to the camera module 1710 or the light module 1720. When input data is not received from the input module 1400 for a specific time, the host processor 1001 may switch the operation mode of the electronic device 1000 to a low power mode or a sleep mode, thereby reducing power consumed by the electronic device 1000.

The host processor 1001 may output a command or data to the display device DD, the sound output module 1630, and the camera module 1710, based on the sensing data received from the sensor module 1610. Alternatively, the host processor 1001 may output the command or data to the light module 1720. For example, the host processor 1001 may compare authentication data authorized by the fingerprint sensor 1611 with authentication data stored in the memory 1300 and then execute the application according to the comparison result. The host processor 1001 may execute the command based on sensing data sensed by the input sensor 1612 or the digitizer 1613 or output relevant frame data to the display device DD. When a temperature sensor is included in the sensor module 1610, the host processor 1001 may receive temperature data on the measured temperature from the sensor module 1610 and further perform brightness correction on the frame data based on the temperature data.

The host processor 1001 may receive measurement data for the presence or absence of a user, a position of the user, a gaze of the user, and the like from the camera module 1710. The host processor 1001 may further perform brightness correction for the frame data, based on the measurement data. For example, the host processor 1001, which determines the presence or absence of the user based on an input from the camera module 1710, may output frame data, which is corrected in brightness through the data transforming circuit 1210 or the gamma correcting circuit 1220, to the display device DD.

Some of the above components may be connected to each other through a communication method between peripheral devices, such as buses, general purpose input/output (GPIO), serial peripheral interface (SPI), mobile industry processor interface (MIPI), or ultra-path interconnect (UPI) link to exchange signals (e.g., commands or data). The host processor 1001 may make communication with the display device DD through an interface promised to each other. For example, the host processor 1001 may employ the above-described communication method, and the present disclosure is not limited to the above-described communication method.

The electronic device 1000 according to various embodiments disclosed in the present document may be various types of devices. The electronic device 1000 may include, for example, at least one of a portable communication device (e.g., a smartphone), a computer device, a portable multimedia device, a portable medical device, a camera, a wearable device, or a home appliance. The electronic device 1000 according to an embodiment of the present document is not limited to the above-described devices.

Figure 2:
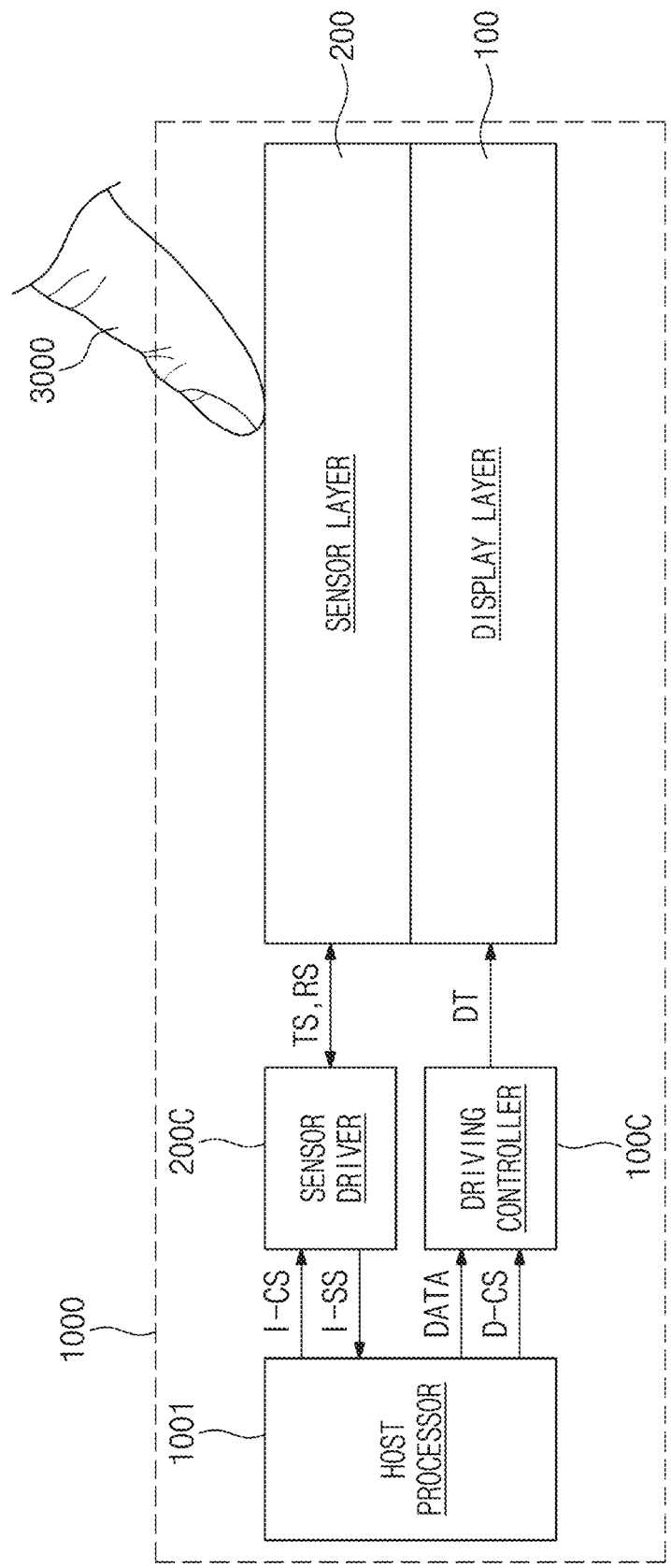
FIG. 2 is a block diagram illustrating an operation of an electronic device according to an embodiment of the present disclosure.

FIG. 2 is a block diagram illustrating an operation of an electronic device according to an embodiment of the present disclosure.

Referring to FIG. 2, the electronic device 1000 may include the display layer 100, a sensor layer 200, the driving controller 100C, a sensor driver 200C, and the host processor 1001. The sensor layer 200 and sensor driver 200C may be examples of components of the input sensor 1612 of FIG. 1.

The display layer 100 may be configured to substantially generate and display an image. The display layer 100 may be a light emitting display layer. For example, the display layer 100 may be an organic light emitting display layer, a quantum dot display layer, a micro-LED display layer, or a nano-LED display layer. The display layer 100 may be referred to as a display panel.

The sensor layer 200 may be disposed on the display layer 100. The sensor layer 200 may sense an external input 3000 applied from the outside. The external input 3000 may be any suitable input mechanism for providing a change in capacitance. For example, the sensor layer 200 may detect not only a passive input unit such as a user body, but also input by an active input unit which provides transmission signals. The sensor layer 200 may be referred to as a sensor, a touch layer, a touch panel, an input sensing layer, or an input sensing panel.

The host processor 1001 may control the overall operation of the electronic device 1000. For example, the host processor 1001 may control operations of the driving controller 100C and the sensor driver 200C. The host processor 1001 may include at least one microprocessor, The driving controller 100C may drive the display layer 100. The driving controller 100C may receive a data signal DATA and one or more control signals D-CS (hereafter, "control signal D-CS") from the host processor 1001. The data signal DATA may be a MIPI signal. The control signal D-CS may include various signals. For example, the control signal D-CS may include an input vertical synchronization signal, an input horizontal synchronization signal, a main clock, and a data enable signal. The driving controller 100C may generate a scan control signal and a data control signal for controlling the driving of the display layer 100 based on the control signal D-CS.

The driving controller 100C may generate image data DT obtained by transforming the format of the data signal DATA to meet the interface specification of the display layer 100.

The sensor driver 200C may drive the sensor layer 200. The sensor driver 200C may receive a control signal I-CS from the host processor 1001. The control signal I-CS may include a clock signal of the sensor layer 200.

The sensor driver 200C may output a transmit signal TS to the sensor layer 200. The sensor driver 200C may calculate coordinate information of an input based on a receive signal RS received from the sensor layer 200 and provide a coordinate signal I-SS with coordinate information, to the host processor 1001. The host processor 1001 executes an operation corresponding to a user input based on the coordinate signal I-SS. For example, the host processor 1001 may operate the display driving controller 100C to display a new application image on the display layer 100.

Figure 3:
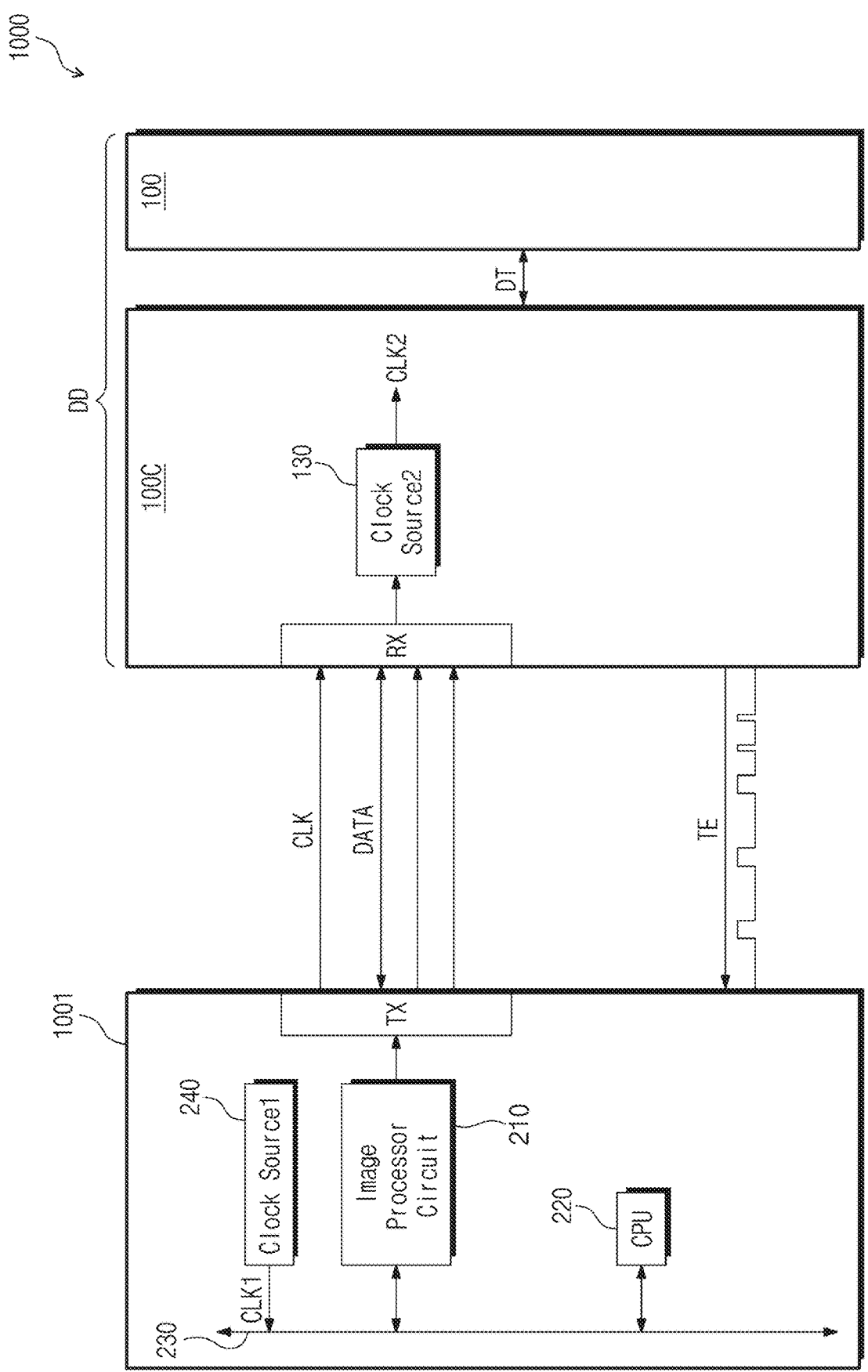
FIG. 3 is a block diagram of an electronic device according to an embodiment of the present disclosure.

FIG. 3 is a block diagram of an electronic device according to an embodiment of the present disclosure.

Referring to FIG. 3, the electronic device 1000 may be a touchscreen display device activated according to an electrical signal. The electronic device 1000 may process image data and display the processed image data through the display layer 100.

The electronic device 1000 may include the host processor 1001 and the display device DD. The display device DD may include the driving controller 100C and the display layer 100.

The host processor 1001 may be implemented in the form of an integrated circuit, a system-on-chip, an application processor, or a mobile application processor, but the present disclosure is not particularly limited thereto. The host processor 1001 may control various components included in the electronic device 1000, for example, the driving controller 100C.

The host processor 1001 and the driving controller 100C may be connected to each other through an interface such as a mobile industry processor interface (MIPI).

The driving controller 100C may output a tearing signal TE to the host processor 1001. The tearing signal TE may be generated based on the vertical synchronization signal. The tearing signal TE may be referred to as a Tearing Effect (TE) signal. The tearing signal is an example of a signal for preventing a tearing effect, which is a visual artifact in which a "tear line" (moving or still) is present in a displayed image.

The data signal DATA may be transmitted in the form of a packet. The data signal DATA may include a first signal LP (see FIG. 11A) and a second signal HS (see FIG. 11A) which is subsequent to the first signal and contains frame data. The details thereof will be described later.

The host processor 1001 may include the image processing circuit 210, a data transmitting unit TX, a central processing unit 220, a bus 230, and a first clock source 240.

The image processing circuit 210 may convert the image data into a format which may be processed by the data transmitting unit TX.

The data transmitting unit TX may include one clock lane and one or more data lanes.

The clock lane may transmit a clock signal CLK. The clock signal CLK may be a signal which is cyclically toggled. The clock signal CLK may be generated based on a first clock signal CLK1 to be described later.

The data lanes may transmit the data signal DATA. The data signal DATA may be transmitted by a bidirectional data lane or a unidirectional data lane.

The central processing unit 220 may control the host processor 1001 to compress the image data and transmit the compressed image data to the driving controller 100C through the data transmitting unit TX.

The central processing unit 220 may control components of the host processor 1001 through the bus 230.

The first clock source 240 may generate the first clock signal CLK1 which is constantly toggled. The first clock signal CLK1 may be used to drive various components and generate various signals, in the host processor 1001. The first clock source 240 may include a ring oscillator, an RC oscillator, a crystal oscillator, or a temperature compensation crystal oscillator. For example, the first clock source 240 may be a crystal oscillator.

The driving controller 100C may control the display layer 100. The driving controller 100C may be connected to the host processor 1001 in a specific interface mode. The driving controller 100C may receive data, for example, the data signal DATA, from the host processor 1001 and generate the image data DT obtained by transforming the format of the data signal DATA to meet the interface specification of the display layer 100.

The driving controller 100C may include a data receiving unit RX and a second clock source 130.

The data receiving unit RX may include one clock lane and at least one data lane. The data receiving unit RX may be connected to the data transmitting unit TX through MIPI.

The clock lane may receive the clock signal CLK. The clock lane of the data receiving unit RX may correspond to the clock lane of the data transmitting unit TX. The clock signal CLK may be provided to the second clock source 130. The second clock source 130 may synchronize a second clock signal CLK2 with the first clock signal CLK1 based on the clock signal CLK.

The data lanes may receive the data signal DATA. The data lanes of the data receiving unit RX may correspond to the data lanes of the data transmitting unit TX.

The second clock source 130 may generate the second clock signal CLK2 which is constantly toggled. The second clock signal CLK2 may be used to drive various components provided in the driving controller 100C and generate various signals. For example, the driving controller 100C may generate a control signal for driving the display layer 100 based on the second clock signal CLK2. The second clock source 130 may include a ring oscillator, an RC oscillator, a crystal oscillator, or a temperature compensation crystal oscillator. For example, the second clock source 130 may be a ring oscillator.

The second clock source 130 may synchronize the second clock signal CLK2 with the first clock signal CLK1 based on the clock signal CLK.

The driving controller 100C may output the tearing signal TE for controlling a transmit period of the data signal DATA to the host processor 1001.

The driving controller 100C may control the period of the tearing signal TE. For example, the driving controller 100C may receive and interpret commands output from the host processor 1001 to adjust the period of the tearing signal TE. The command may include information on the size of the vertical blank region of the data signal DATA.

Figure 4:
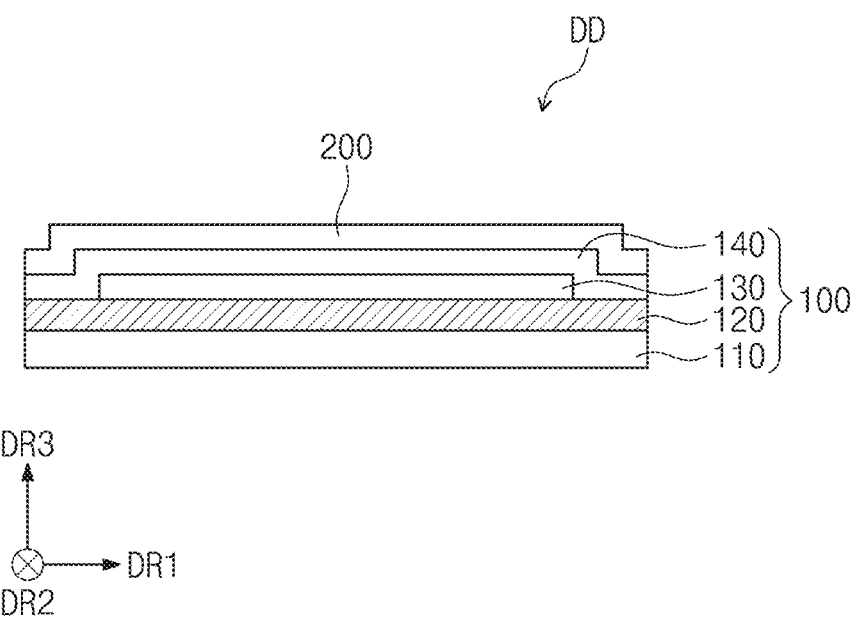
FIG. 4 is a cross-sectional view of a display device according to an embodiment of the present disclosure.

FIG. 4 is a cross-sectional view of a display device according to an embodiment of the present disclosure.

Referring to FIG. 4, the display device DD may include the display layer 100 and the sensor layer 200.

The display layer 100 may include a base layer 110, a circuit layer 120, a light emitting element layer 130, and an encapsulating layer 140.

The base layer 110 may be a member providing a base surface on which the circuit layer 120 is disposed. The base layer 110 may be a glass substrate, a metal substrate, or a polymer substrate. However, the configuration is not limited thereto, and the base layer 110 may be an inorganic layer, an organic layer, or a composite material layer.

The base layer 110 may have a multilayer structure. For example, the base layer 110 may include a first synthetic resin layer, a silicon oxide SiOx layer disposed on the first synthetic resin layer, an amorphous silicon a-Si layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. Meanwhile, in the present specification, the wording "~~ based resin" may refer to "a functional group of ~".

The circuit layer 120 may be disposed on the base layer 110. The circuit layer 120 may include an insulating layer, a semiconductor pattern, a conductive pattern, and a signal line. The insulating layer, the semiconductor layer, and the conductive layer are formed on the base layer 110 through coating and deposition schemes. Thereafter, the insulating layer, the semiconductor layer, and the conductive layer may be selectively patterned through multiple photolithography processes. Thereafter, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro-LED, or a nano-LED.

The encapsulating layer 140 may be disposed on the light emitting element layer 130. The encapsulating layer 140 may protect the light emitting element layer 130 from foreign substances such as moisture, oxygen, and dust particles.

The sensor layer 200 may be disposed on the display layer 100. The sensor layer 200 may sense an external input applied from the outside. The external input may be a user input. The user input may include various types of external inputs such as a portion of the user body, light, heat, pen, or pressure.

The sensor layer 200 may be formed on the display layer 100 through subsequent processes. In this case, the sensor layer 200 may be expressed as being directly disposed on the display layer 100. The wording "directly disposed" may refer to that a third component is not interposed between the sensor layer 200 and the display layer 100. In other words, a separate adhesive member may not be interposed between the sensor layer 200 and the display layer 100. Alternatively, the sensor layer 200 may be coupled to the display layer 100 by an adhesive member. The adhesive member may include a conventional adhesive or adhesive.

Although not illustrated, the display device DD may further include an anti-reflective layer and an optical layer disposed on the sensor layer 200. The anti-reflective layer may reduce reflectance of external light incident from the outside of the display device DD. The optical layer may improve the front brightness of the display device DD by controlling the direction of light incident from the display layer 100.

Figure 5:
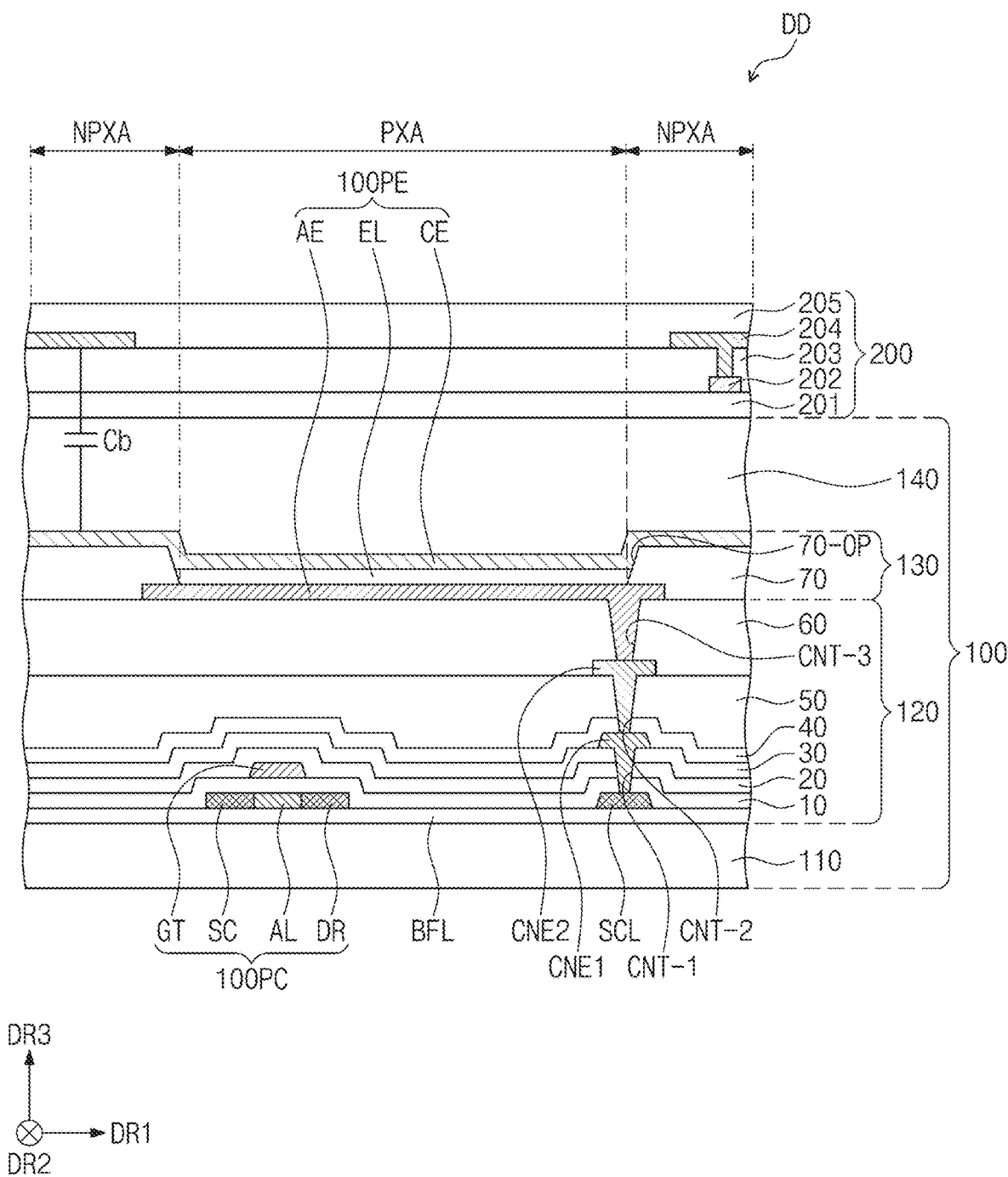
FIG. 5 is a cross-sectional view of a display device according to an embodiment of the present disclosure.

FIG. 5 is a cross-sectional view of a display device according to an embodiment of the present disclosure.

Referring to FIG. 5, at least one inorganic layer is formed on a top surface of the base layer 110. The inorganic layer may include at least one of aluminum oxide, titanium oxide, silicon oxide, silicon nitride, silicon oxynitride, zirconium oxide, or hafnium oxide. The inorganic layer may be formed in multiple layers. The multilayer inorganic layers may include a barrier layer and/or a buffer layer. According to an embodiment, the display layer 100 is illustrated as including a buffer layer BFL.

The buffer layer BFL may improve a bonding force between the base layer 110 and the semiconductor pattern. The buffer layer BFL may include at least one of silicon oxide, silicon nitride, or silicon oxynitride. For example, the buffer layer BFL may have a structure in which silicon oxide layers and silicon nitride layers are alternately stacked.

The semiconductor pattern may be disposed on the buffer layer BFL. The semiconductor pattern may include polysilicon. However, the semiconductor pattern is not limited thereto, and may include amorphous silicon, low-temperature polycrystalline silicon, or oxide semiconductor.

FIG. 5 merely illustrates some semiconductor patterns, and the semiconductor patterns may be further disposed in other regions. Semiconductor patterns may be arranged in specific rules across pixels. The semiconductor patterns may have different electrical properties depending on whether the semiconductor patterns are doped. The semiconductor pattern may include a first region having high conductivity and a second region having low conductivity. The first region may be doped with an N-type dopant or a P-type dopant. The P-type transistor may include a doped region doped with a P-type dopant, and the N-type transistor may include a doped region doped with an N-type dopant. The second region may be a non-doped region or a region doped at a lower concentration than that of the first region.

The conductivity of the first region is greater than that of the second region, and the first region may substantially serve as an electrode or a signal line. The second region may substantially correspond to an active (or channel) of a transistor. In other words, a portion of the semiconductor pattern may be active of the transistor, another portion of the semiconductor pattern may be a source or drain of the transistor, and another portion of the semiconductor pattern may be a connection electrode or a connection signal line.

Each of the pixels may have an equivalent circuit including seven transistors, one capacitor, and a light emitting element 100PE, and the equivalent circuit diagram of the pixel may be modified in various forms. FIG. 5 illustrates one transistor 100PC and the light emitting element 100PE included in a pixel.

A source SC, an active AL, and a drain DR of the transistor 100PC may be formed from a semiconductor pattern. The source SC and the drain DR may extend in opposite directions from the active AL, when viewed in a cross-sectional view. FIG. 5 illustrates a portion of a connection signal line SCL formed from the semiconductor pattern. Although not illustrated separately, the connection signal line SCL may be connected to the drain DR of the transistor 100PC when viewed in a plan.

A first insulating layer 10 may be disposed on the buffer layer BFL. The first insulating layer 10 commonly overlaps the plurality of pixels and may cover the semiconductor pattern. The first insulating layer 10 may be an inorganic layer and/or an organic layer, and may have a single-layer structure or a multiple-layer structure. The first insulating layer 10 may include at least one of aluminum oxide, titanium oxide, silicon oxide, silicon nitride, silicon oxynitride, zirconium oxide, or hafnium oxide. According to an embodiment, the first insulating layer 10 may be a single layer of silicon oxide. In addition to the first insulating layer 10, the insulating layer of the circuit layer 120 to be described later may be an inorganic layer and/or an organic layer, and may have a single-layer structure or a multi-layer structure. The inorganic layer may include at least one of the above-described materials, but the present disclosure is not limited thereto.

A gate GT of the transistor 100PC is disposed on the first insulating layer 10. The gate GT may be a portion of the metal pattern. The gate GT overlaps the active AL. In the process of doping the semiconductor pattern, the gate GT may function as a mask.

A second insulating layer 20 may be disposed on the first insulating layer 10 and may cover the gate GT. The second insulating layer 20 may commonly overlap the pixels. The second insulating layer 20 may include an inorganic layer and/or an organic layer, and may have a single-layer structure or multi-layer structure. The second insulating layer 20 may include at least one of silicon oxide, silicon nitride, or silicon oxynitride. According to an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer structure or a multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 formed through the first, second, and third insulating layers 10, 20, and 30.

A fourth insulating layer 40 may be disposed on the third insulating layer 30. The fourth insulating layer 40 may be a single layer silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 formed through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, a quantum dot, a quantum rod, a micro LED, or a nano LED. Hereinafter, although it will be described by way of example that the light emitting element 100PE is an organic light emitting element, the present disclosure is not particularly limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 formed through the sixth insulating layer 60.

A pixel defining layer 70 is disposed on the sixth insulating layer 60 and may cover a portion of the first electrode AE. An opening 70-OP is defined in the pixel defining layer 70. The opening 70-OP in the pixel defining layer 70 exposes at least a portion of the first electrode AE.

The active region of the display device DD may include a light emitting region PXA and a non-light emitting region NPXA adjacent to the light emitting region PXA. The non-light emitting region NPXA may surround the light emitting region PXA. According to an embodiment, the light emitting region PXA is defined to correspond to a partial region of the first electrode AE exposed by the opening 70-OP.

The light emitting layer EL may be disposed on the first electrode AE. The light emitting layer EL may be disposed in a region corresponding to the opening 70-OP. In other words, the light emitting layer EL may be formed to be separated from each of the pixels. When the light emitting layer EL is formed separately from each of the pixels, each of the light emitting layers EL may emit light of at least one of a blue color, a red color, or a green color. However, the present disclosure is not limited thereto, and the light emitting layer EL may be connected to pixels and provided in common. In this case, the light emitting layer EL may provide blue light or white light.

The second electrode CE may be disposed on the light emitting layer EL. The second electrode CE may have an integral form and may be commonly disposed in a plurality of pixels.

Although not illustrated, a hole control layer may be disposed between the first electrode AE and the light emitting layer EL. The hole control layer may be commonly disposed in the light emitting region PXA and the non-light emitting region NPXA. The hole control layer may include a hole transport layer and may further include a hole injection layer. An electron control layer may be interposed between the light emitting layer EL and the second electrode CE. The electron control layer may include an electron transport layer, and may further include an electron injection layer. The hole control layer and the electron control layer may be commonly formed in a plurality of pixels using an open mask.

The encapsulating layer 140 may be disposed on the light emitting element layer 130. The encapsulating layer 140 may include sequentially stacked the inorganic layer, the organic layer, and the inorganic layer, but the layers constituting the encapsulating layer 140 are not limited thereto.

The inorganic layers protect the light emitting element layer 130 from moisture and oxygen, and the organic layer may protect the light emitting element layer 130 from foreign substances such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but the present disclosure is not limited thereto.

The sensor layer 200 may include a base layer 201, a first conductive layer 202, a sensing insulating layer 203, a second conductive layer 204, and a cover insulating layer 205.

The base layer 201 may be an inorganic layer including at least one of silicon nitride, silicon oxynitride, or silicon oxide. Alternatively, the base layer 201 may be an organic layer including epoxy resin, acrylic resin, or imide-based resin. The base layer 201 may have a single layer structure or a multilayer structure stacked in a third direction DR3.

Each of the first conductive layer 202 and the second conductive layer 204 may have a single layer structure or a multilayer structure stacked in the third direction DR3.

The conductive layer having a single layer structure may include a metal layer or a transparent conductive layer. The metal layer may include molybdenum, silver, titanium, copper, aluminum, or the alloy thereof. The transparent conductive layer may include a transparent conductive oxide such as indium tin oxide (ITO), indium zinc oxide (IZO), zinc oxide (ZnO), or indium zinc tin oxide (IZTO). In addition, the transparent conductive layer may include a conductive polymer such as PEDOT, metal nanowires, graphene, and the like.

The conductive layer having the multi-layer structure may include metal layers. The metal layers may have, for example, a three-layer structure of titanium/aluminum/titanium. The conductive layer having the multi-layer structure may include at least one metal layer and at least one transparent conductive layer.

At least one of the sensing insulating layer 203 or the cover insulating layer 205 may include an inorganic film. The inorganic film may include at least one of aluminum oxide, titanium oxide, silicon oxide, silicon nitride, silicon oxynitride, zirconium oxide, or hafnium oxide.

At least one of the sensing insulating layer 203 or the cover insulating layer 205 may include an organic film. The organic film may include at least one of acrylic resin, methacrylic resin, polyisoprene resin, vinyl resin, epoxy resin, urethane resin, cellulose resin, siloxane resin, polyimide resin, polyamide resin, or a perylene resin.

A parasitic capacitor Cb may be formed between the sensor layer 200 and the second electrode CE. The parasitic capacitor Cb may be referred to as a base capacitance. As the distance between the sensor layer 200 and the second electrode CE is decreased, capacitance of the parasitic capacitor Cb may be increased. As the capacitance of the parasitic capacitor Cb is increased, the ratio of the amount of change in capacitance to the reference value may be decreased. The amount of change in capacitance refers to the change in capacitance which is made between before and after the input by the input unit, for example, the user body 3000 (see FIG. 2).

The sensor driver 200C (see FIG. 2) which processes the signal sensed from the sensor layer 200 may perform a calibration operation which removes a value corresponding to the capacitance of the parasitic capacitor Cb from the sensed signal. The ratio of the amount of capacitance change to the reference value is increased by the calibration operation, and thus the sensing sensitivity may be improved.

Figure 6:
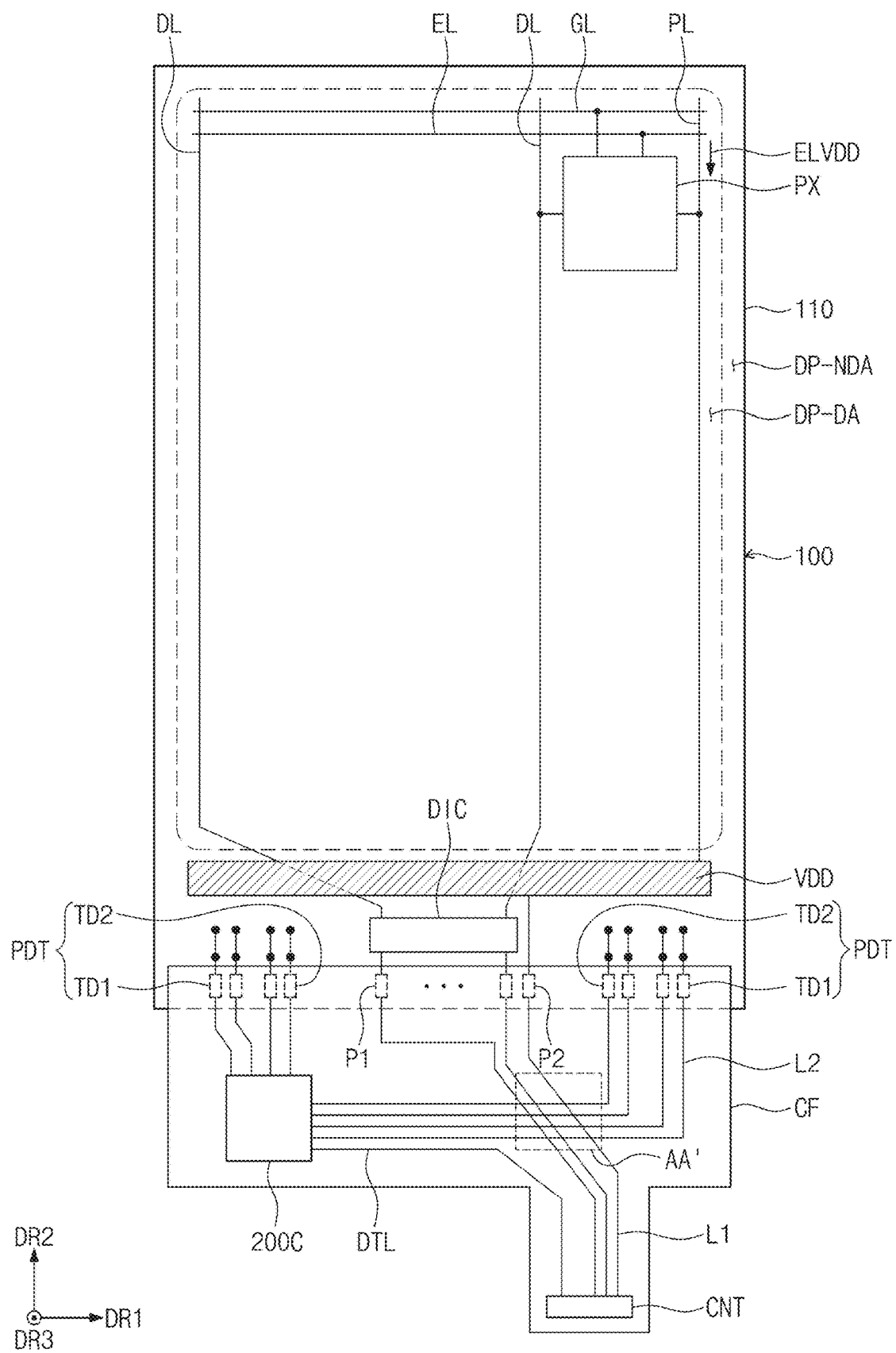
FIG. 6 is a plan view of a display layer, a flexible substrate, and a sensor driver according to an embodiment of the present disclosure.

FIG. 6 is a plan view illustrating a display layer, a flexible substrate, and a sensor driver according to an embodiment of the present disclosure.

Referring to FIG. 6, the display device DD may include the display layer 100, a power pattern VDD, the data driver DIC, a flexible substrate CF, the sensor driver 200C, a display signal line L1, a sensor signal line L2, a first communication line DTL, and a connector CNT.

A display region DP-DA and a peripheral region DP-NDA adjacent to the display region DP-DA may be defined in the display layer 100. The display region DP-DA may be a region in which an image is displayed. A plurality of pixels PX may be disposed in the display region DP-DA. The peripheral region DP-NDA may be a region in which a driving circuit and a driving wiring are disposed.

The display layer 100 may include a base substrate 110, the plurality of pixels PX, a plurality of signal lines GL, DL, PL, and EL, a plurality of display pads P1 and P2, and a plurality of sensing pads PDT.

Each of the plurality of pixels PX may display one of primary colors and one of mixed colors. The primary colors may include a red color, a green color, or a blue color. The mixed colors may include various colors such as a white color, a yellow color, a cyan color, or a magenta color. However, the color displayed by each of the pixels PX is not limited thereto.

The plurality of signal lines GL, DL, PL, and EL may be disposed on the base substrate 110. The plurality of signal lines GL, DL, PL, and EL may be connected to the plurality of pixels PX to transmit electrical signals to the plurality of pixels PX. The plurality of signal lines GL, DL, PL, and EL may include a plurality of scan lines GL, a plurality of data lines DL, a plurality of power lines PL, and a plurality of light emission control lines EL. However, this is provided only for the illustrative purpose, and the configuration of the plurality of signal lines GL, DL, PL, and EL according to an embodiment of the present disclosure is not limited thereto. For example, the plurality of signal lines GL, DL, PL, and EL according to an embodiment of the present disclosure may further include initialization voltage lines.

The power pattern VDD may be disposed in the peripheral region DP-NDA. The power pattern VDD may be connected to a plurality of power lines PL. Each of the plurality of pixels PX may receive a power voltage ELVDD provided by the power line PL.

The plurality of display pads P1 and P2 may be disposed in the peripheral region DP-NDA. The plurality of display pads P1 and P2 may include the first pad P1 and the second pad P2. The plurality of first pads P1 may be provided. The plurality of first pads P1 may be connected to a plurality of data lines DL, respectively. The second pad P2 may be connected to the power pattern VDD to be electrically connected to the plurality of power lines PL. A display panel DP may provide electrical signals provided from the outside to the plurality of pixels PX through the plurality of display pads P1 and P2. Meanwhile, the plurality of display pads P1 and P2 may further include pads to receive different electrical signals in addition to the first pad P1 and the second pad P2, and the present disclosure is not limited thereto.

The data driver DIC may be mounted in the peripheral region DP-NDA. The data driver DIC may be a timing control circuit in the form of a chip. The data driver DIC may output a grayscale voltage to multiple data lines DL in response to frame data of image data (DT, see FIG. 2). The plurality of data lines DL may be electrically connected to the plurality of first pads P1 via the data driver DIC, respectively. However, this is exemplary, and the data driver DIC according to an embodiment of the present disclosure may be mounted on a film separate from the display layer 100. The data driver DIC may be electrically connected to the plurality of display pads P1 and P2 through the film. For example, the film may be the flexible substrate CF.

The plurality of sensing pads PDT may be disposed in the peripheral region DP-NDA. The plurality of sensing pads PDT may be electrically connected to a plurality of sensing electrodes of the sensor layer 200 (see FIG. 2). The plurality of sensing pads PDT may include a plurality of first sensing pads TD1 and a plurality of second sensing pads TD2.

The flexible substrate CF may be electrically connected to the plurality of display pads P1 and P2 and the plurality of sensing pads PDT.

The sensor driver 200C may be mounted on the flexible substrate CF. The sensor driver 200C may be electrically connected to the plurality of sensing pads PDT.

The connector CNT may electrically connect the host processor 1001 to the display layer 100. The connector CNT may be disposed on the flexible substrate CF. The display signal line L1 may be electrically connected between the display layer 100 and the host processor 1001. For example, the display signal line L1 may be connected between the plurality of display pads P1 and P2 and the connector CNT. The display signal line L1 may transmit and receive data signals DATA (see FIG. 2). The display signal line L1 may be disposed on the flexible substrate CF. The display signal line L1 may be referred to as an MIPI wiring.

The sensor signal line L2 may be electrically connected between the sensor layer 200 and the sensor driver 200C. For example, the sensor signal line L2 may be connected between the plurality of sensing pads PDT and the sensor driver 200C. The sensor signal line L2 may transmit and receive the transmit signal TS (see FIG. 2) and the receive signal RS (see FIG. 2). The sensor signal line L2 may be disposed on the flexible substrate CF.

The first communication line DTL may be electrically connected between the sensor driver 200C and the connector CNT. The first communication line DTL may transmit driving information of the sensor layer 200. The first communication line DTL may include various communication lines to transmit driving information. For example, the first communication line DTL may include general-purpose input/output (GPIO).

The first communication line DTL may output the driving information to the host processor 1001. The host processor 1001 may change a delay of a first signal LP with respect to a sensing transmit signal or with respect to a tearing signal (see FIG. 11A), the duty cycle ("duty ratio") of the first signal LP, and the first frequency of the data signal DATA (see FIG. 2) based on the driving information. The details thereof will be described later.

Figure 7:
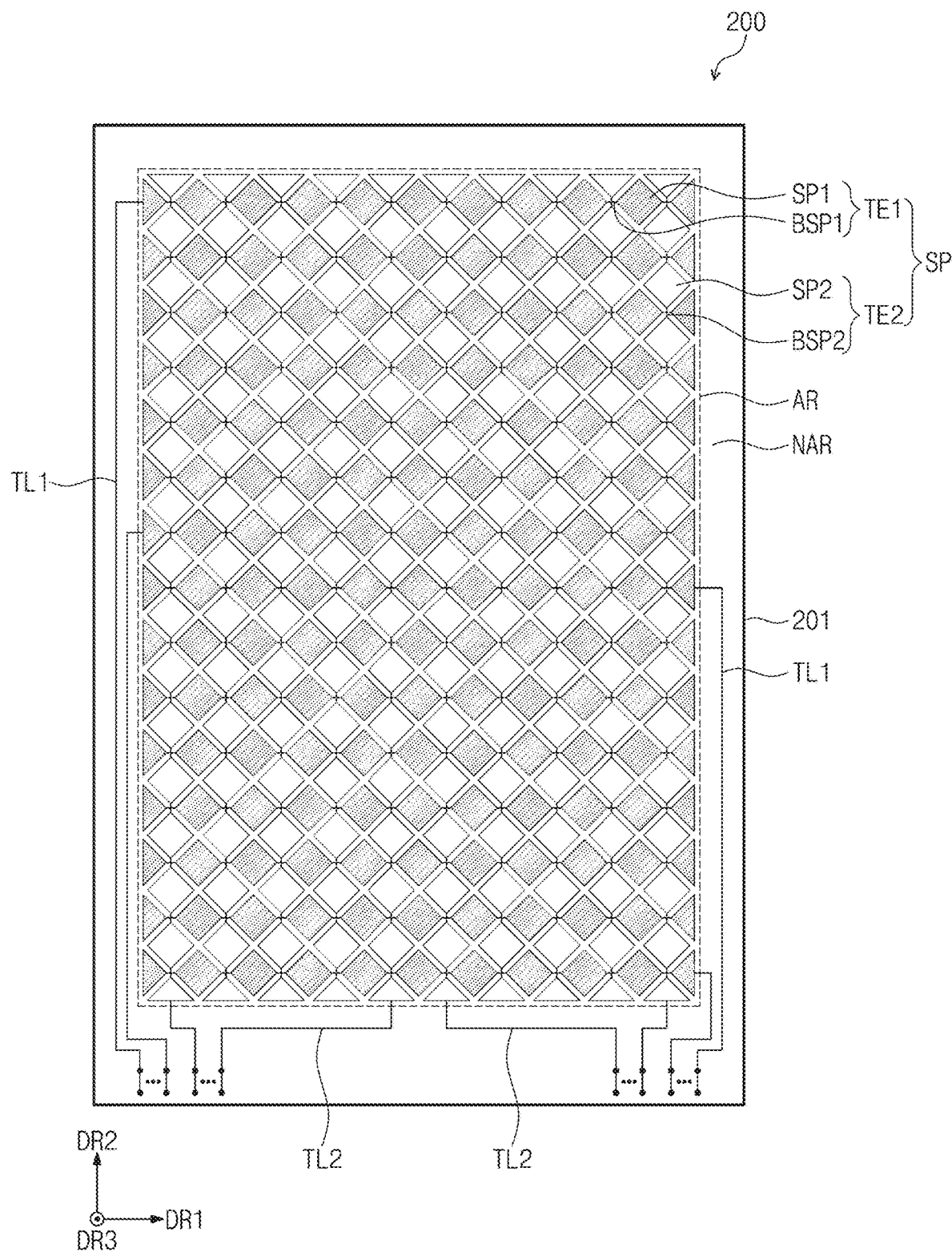
FIG. 7 is a plan view of a sensor layer according to an embodiment of the present disclosure.

FIG. 7 is a plan view of a sensor layer according to an embodiment of the present disclosure.

Referring to FIGS. 6 and 7, the sensor layer 200 may include an active region AR and a peripheral region NAR adjacent to the active region AR. The active region AR may be a region which is activated by an electrical signal. The active region AR may be a region for sensing an input. The active region AR may overlap the display region DP-DA of the display layer 100. The peripheral region NAR may overlap the peripheral region DP-NDA of the display layer 100.

The sensor layer 200 may include the base layer 201, a plurality of sensing electrodes SP, and a plurality of sensing lines TL1 and TL2. A plurality of first sensing electrodes TE1 and a plurality of second sensing electrodes TE2 may be disposed in the active region AR, and a plurality of sensing lines TL1 and TL2 may be disposed in the peripheral region NAR.

The base layer 201 may be an inorganic layer including any one of silicon nitride, silicon oxynitride, and silicon oxide. Alternatively, the base layer 201 may be an organic layer including epoxy resin, acrylic resin, or imide-based resin. The base layer 201 may be directly formed on the display layer 100. Alternatively, the base layer 201 may be bonded to the display layer 100 through an adhesive member.

The plurality of sensing electrodes SP may include the plurality of first sensing electrodes TE1 and the plurality of second sensing electrodes TE2. An input sensing layer may obtain information on an external input through a change in capacitance between the plurality of first sensing electrodes TE1 and the plurality of second sensing electrodes TE2.

The plurality of first sensing electrodes TE1 may extend in a first direction DR1, and may be arranged in a second direction DR2. The plurality of first sensing electrodes TE1 may include a plurality of first parts SP1 and a plurality of second parts BSP1. Each of the plurality of second parts BSP1 may electrically connect two adjacent first parts SP1. The plurality of first parts SP1 and the plurality of second parts BSP1 may have a mesh structure. The plurality of first parts SP1 may be referred to as a plurality of first sensing parts SP1. The plurality of second parts BSP1 may be referred to as a plurality of first connection parts BSP1.

The plurality of second sensing electrodes TE2 may extend in the second direction DR2, and may be arranged in the first direction DR1. The plurality of second sensing electrodes TE2 may include a plurality of sensing patterns SP2 and a plurality of bridge patterns BSP2. The plurality of bridge patterns BSP2 may electrically connect two adjacent sensing patterns SP2 to each other. The plurality of sensing patterns SP2 may have a mesh structure. The plurality of sensing patterns SP2 may be referred to as a plurality of second sensing parts SP2. The plurality of bridge patterns BSP2 may be referred to as the plurality of second connection parts BSP2.

The plurality of second parts BSP1 may be disposed in different layers from the layer of the plurality of bridge patterns BSP2. The plurality of bridge patterns BSP2 may be insulated from the plurality of first sensing electrodes TE1 while crossing the plurality of first sensing electrodes TE1. For example, the plurality of second parts BSP1 may be insulated from the plurality of bridge patterns BSP2 while crossing the plurality of bridge patterns BSP2.

The plurality of sensing lines TL1 and TL2 may include a plurality of first sensing lines TL1 and a plurality of second sensing lines TL2. The plurality of first sensing lines TL1 may be electrically connected to the plurality of first sensing electrodes TE1, respectively. The plurality of second sensing lines TL2 may be electrically connected to the plurality of second sensing electrodes TE2, respectively.

The plurality of first sensing lines TL1 may be electrically connected to the plurality of first sensing pads TD1 through contact holes, respectively. The plurality of second sensing lines TL2 may be electrically connected to the plurality of second sensing pads TD2, respectively, through contact holes.

Figure 8:
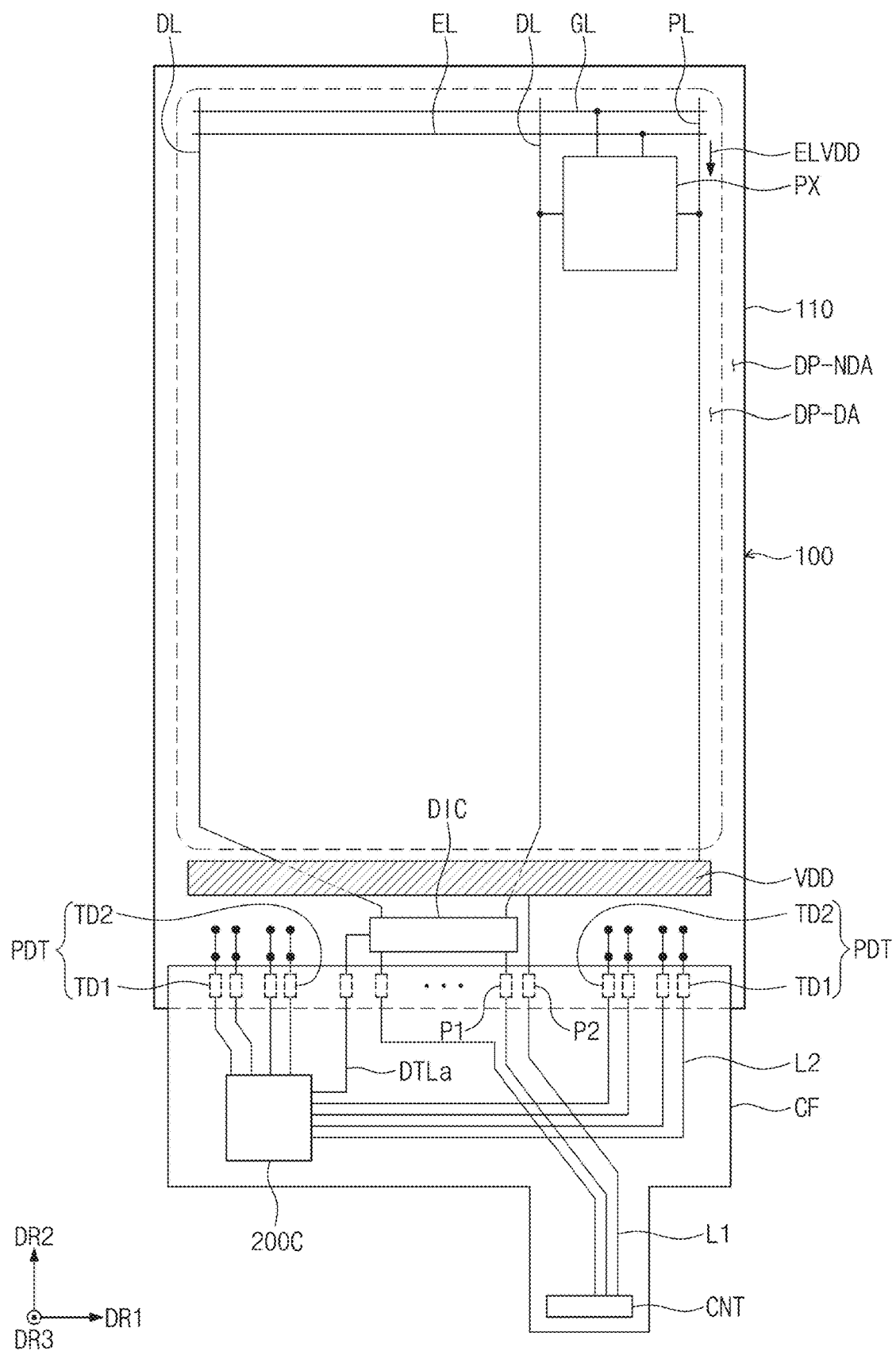
FIG. 8 is a plan view of a display layer, a flexible substrate, and a sensor driver according to an embodiment of the present disclosure.

FIG. 8 is a plan view of a display layer, a flexible substrate, and a sensor driver according to an embodiment of the present disclosure. In the following description made with reference to FIG. 8, the same reference numerals will be assigned the same components described with reference to FIG. 6, and the details thereof will be omitted.

Referring to FIG. 8, a second communication line DTLa may be electrically connected between the sensor driver 200C and the data driver DIC. The second communication line DTLa may transmit driving information of the sensor layer 200. The second communication line DTLa may include various communication lines capable of transmitting the driving information. For example, the second communication line DTLa may include general-purpose input/output (GPIO).

The second communication line DTLa may output the driving information to the data driver DIC. The data driver DIC may transmit a signal for requesting a change in the delay of the first signal LP (see FIG. 11A) of the data signal DATA (see FIG. 2), the duty ratio of the first signal LP (see FIG. 11A), and a first frequency F1 (see FIG. 11A) of the first signal LP to the host processor 1001 based on the driving information.

Figure 9A:
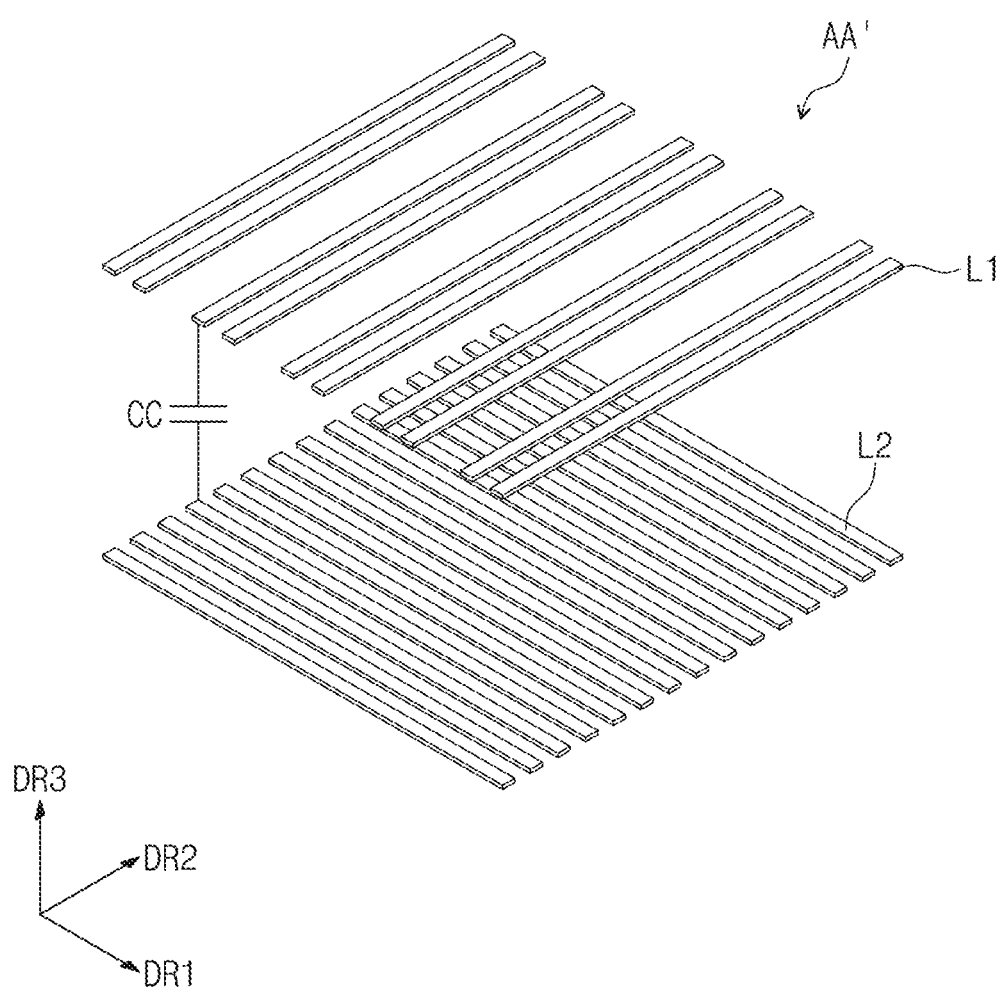
FIG. 9A is an exploded perspective view illustrating region AA' of FIG. 6 according to an embodiment of the present disclosure.

FIG. 9A is an exploded perspective view illustrating region AA' of FIG. 6 according to an embodiment of the present disclosure.

Referring to FIGS. 6 and 9A, the display signal line L1 and the sensor signal line L2 may be disposed on the flexible substrate CF. For example, the sensor signal line L2 may be placed on the flexible substrate CF, and the display signal line L1 may be placed on the sensor signal line L2. The display signal line L1 and the sensor signal line L2 may be spaced apart from each other in the third direction DR3.

When viewed in a plan view, the display signal line L1 and the sensor signal line L2 may overlap each other. A specific interference capacitor CC may be formed between the display signal line L1 and the sensor signal line L2.

According to the present disclosure, an additional layer for shielding an electromagnetic field may not be disposed between the display signal line L1 and the sensor signal line L2. Accordingly, the layer disposed on the flexible substrate CF is reduced, and thus the thickness of the flexible substrate CF may be reduced. In addition, the degree of freedom may be increased in the design of the layer disposed on the flexible substrate CF. Accordingly, the electronic device 1000 (see FIG. 1) may be provided with improved reliability.

Figure 9B:
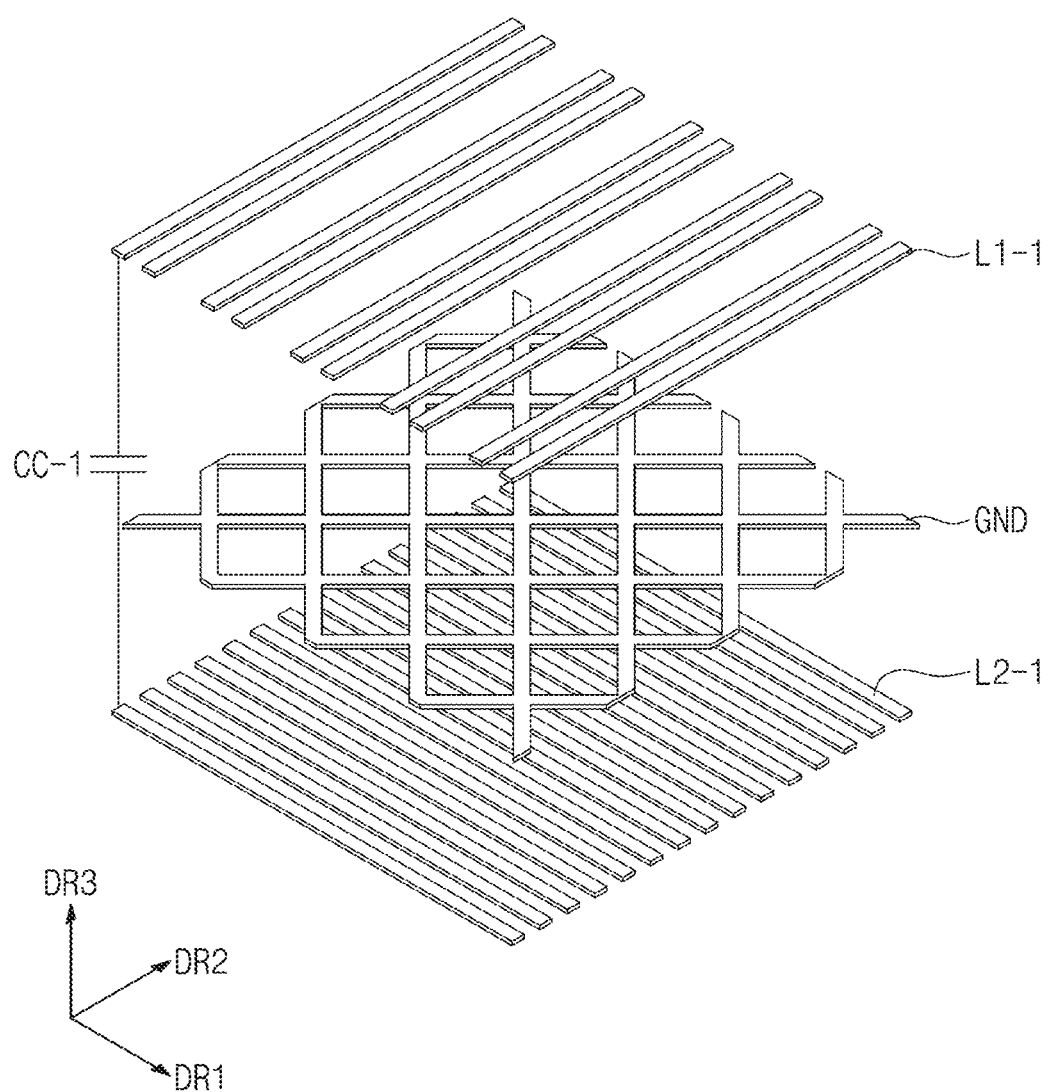
FIG. 9B is an exploded perspective view illustrating a region corresponding to region AA' of FIG. 6, according to an embodiment of the present disclosure.

FIG. 9B is an exploded perspective view illustrating a region corresponding to region AA' of FIG. 6, according to an embodiment of the present disclosure.

Referring to FIGS. 6 and 9B, a display signal line L1-1, a sensor signal line L2-1, and a ground layer GND may be disposed on the flexible substrate CF. For example, the sensor signal line L2-1 may be disposed on the flexible substrate CF, the ground layer GND may be disposed on the sensor signal line L2-1, and the display signal line L1-1 may be disposed on the ground layer GND. The display signal line L1-1 and the sensor signal line L2-1 may be spaced apart from each other in the third direction DR3 while interposing the ground layer GND between the display signal line L1-1 and the sensor signal line L2-1.

The ground layer GND may be disposed between the display signal line L1-1 and the sensor signal line L2-1. The ground layer GND may be disposed to minimize interference between the display signal line L1-1 and the sensor signal line L2-1. The ground layer GND may have a mesh structure for impedance matching of the display signal line L1-1. However, this is provided only for the illustrative purpose, and the form of the ground layer GND according to an embodiment of the present disclosure is not limited thereto. For example, the ground layer GND may be provided in the form of a solid plate. In addition, a plurality of ground layers GND may be provided.

When viewed in a plan view, the display signal line L1-1 and the sensor signal line L2-1 may overlap each other. A specific interference capacitor CC-1 may be formed between the display signal line L1-1 and the sensor signal line L2-1.

Figure 10:
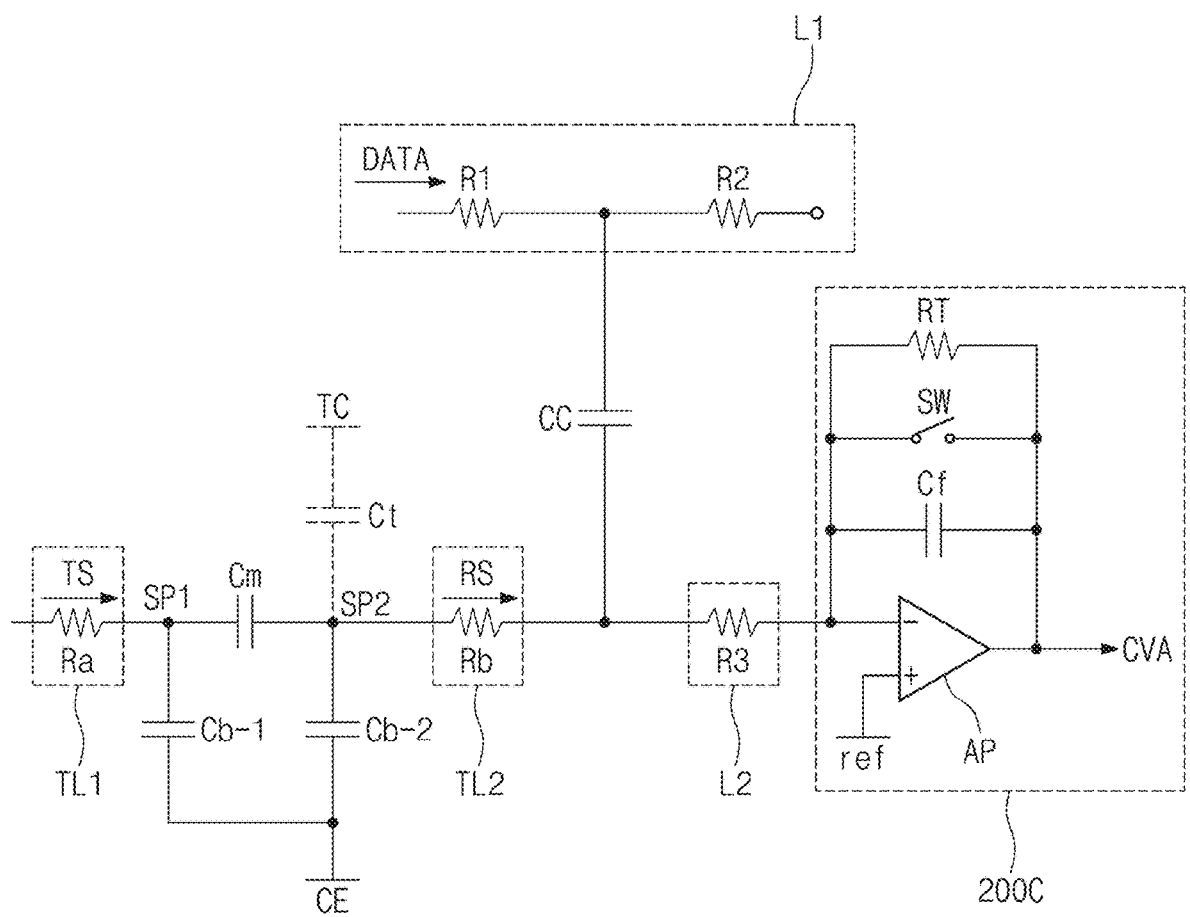
FIG. 10 is a circuit diagram illustrating an electrical connection relationship among a sensor layer, a display signal line, a sensor signal line, and a sensor driver according to an embodiment of the present disclosure.

FIG. 10 is a circuit diagram illustrating an electrical connection relationship between a sensor layer, a display signal line, a sensor signal line, and a sensor driver according to an embodiment of the present disclosure.

Referring to FIGS. 6, 7, and 10, the first sensing line TL1 may have a first sensing resistor Ra. The transmit signal TS may be provided to the first sensing line TL1.

The parasitic capacitor Cb (see FIG. 5) may include a first parasitic capacitor Cb-1 between the first sensing part SP1 of the first sensing electrode TE1 and the second electrode CE, and a second parasitic capacitor Cb-2 between the second sensing part SP2 of the second sensing electrode TE2 and the second electrode CE.

In addition, depending on an external input TC, there may be a change in the capacitance of a mutual capacitor Cm defined between the first sensing part SP1 and the second sensing part SP2 at the point. A sensing capacitor Ct may be formed between the external input TC and the sensing electrodes SP according to the external input TC. The sensing capacitor Ct may include a first sensing capacitor formed between the external input TC and the first sensing part SP1, and a second sensing capacitor formed between the external input TC and the second sensing part SP2.

The second sensing line TL2 may have a second sensing resistor Rb. The receive signal RS may be provided to the second sensing line TL2.

When the external input TC is close, the receive signal RS may be provided with a component caused by the capacitance of each of the first sensing capacitor and the second sensing capacitor.

The display signal line L1 may have a first resistor R1 and a second resistor R2. The data signal DATA may be provided to the display signal line L1.

The sensor signal line L2 may have a third resistor R3. The receive signal RS may be provided to the sensor signal line L2.

The interference capacitor CC may be formed between the display signal line L1 and the sensor signal line L2.

The data signal DATA may cause interference in the receive signal RS through the interference capacitor CC. In this case, the high frequency component of the data signal DATA may be filtered by an operational amplifier AP of the sensor driver 200C.

In a conventional electronic device, the low frequency component of the data signal DATA may influence the analysis of the receive signal RS. However, according to the present disclosure, the host processor 1001 may determine the frequency of the low frequency component based on the frequency of the transmit signal TS and control the timings of the rising and falling components of the low frequency component so that noise due to the rising and falling components cancels each other in a specific sampling period of the receive signal RS. Alternatively, after sweeping the packet frequency of the data signal DATA over a range of packet frequencies and driving the sensor layer 200 to measure noise from the receive signal RS, the host processor 1001 may select, as a frequency of the low frequency component, one of a plurality of candidate frequencies at which noise is below a predetermined threshold. Accordingly, noise of the receive signal RS may be removed or reduced. Accordingly, the electronic device 1000 (see FIG. 1) with improved reliability may be provided.

The sensor driver 200C may include the operational amplifier AP, a capacitor Cf, a switch SW, and a resistor RT.

A signal via an output node is input to a first input node (e.g., a negative input node) of the operational amplifier AP. A reference signal ref operating at a specific cycle is input to a second input node (e.g., a positive input node) of the operational amplifier AP. The capacitor Cf is provided between the first input node and the output node of the operational amplifier AP. The capacitor Cf, the switch SW, and the resistor RT may be connected in parallel to each other.

The reference signal ref is a voltage signal for generating a current of the output node and sensing a change in the current by a touch. For example, the reference signal ref may be implemented in the form of a square wave. As the voltage range of the reference signal ref swings to a specific voltage range, the operational amplifier AP may transform the current sensed by the output node into a voltage. A detection voltage CVA detected in the operational amplifier AP may be provided as a feedback voltage to the output node by the switch SW.

Figure 11A:
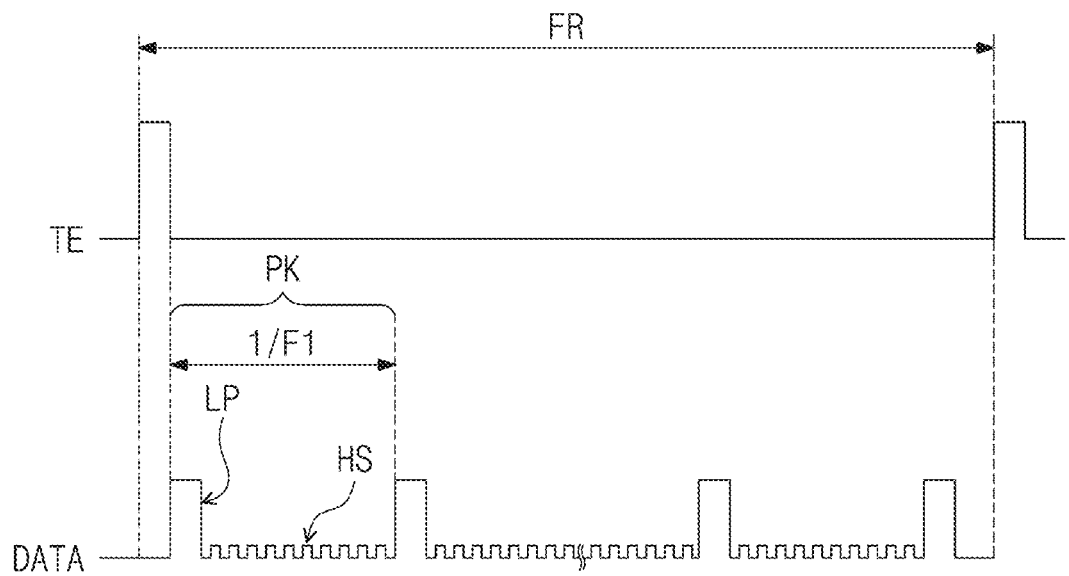
FIG. 11A illustrates a tearing signal and a data signal according to an embodiment of the present disclosure.

FIG. 11A illustrates a tearing signal and a data signal according to an embodiment of the present disclosure.

Referring to FIGS. 3, 6, and 11A, the display layer 100 may display an image in units of a frame period FR. The frame period FR may be realized by displaying image frames a specific frame frequency (1/FR Hz).

The driving controller 100C may output the tearing signal TE for controlling a transmit period of the data signal DATA to the host processor 1001. The driving controller 100C may control the period of the tearing signal TE. The tearing signal TE may be operated in unit of frame period FR.

The host processor 1001 may output frame data, which is output during the frame period FR, to the driving controller 100C in units of packets through a plurality of data lanes in response to the tearing signal TE of the driving controller 100C.

The data signal DATA may be transmitted in the form of a packet. The data signal DATA may include a plurality of packets PK. Each of the plurality of packets PK may include the first signal LP and the second signal HS.

The first signal LP may not include frame data. For example, the first signal LP is a signal at the beginning of each horizontal period. The first signal LP may be a low-power signal. (Since the first signal LP does not include frame data, power that would otherwise be consumed to process such frame data may be conserved during the time that the first signal LP is transmitted. Thus, the first signal LP may be considered a "low-power signal".) The first signal LP may have the first frequency F1. The first frequency F1 may have a frequency ranging from 80 kHz to 600 kHz. The first signal LP may have a voltage of 1.0 V to 1.2 V. The first frequency F1 may be referred to as a frequency of the packet PK.

The first signal LP may be referred to as a low frequency component of the data signal DATA. The period in which the first signal LP is transmitted may be referred to as a period of a low power (LP) mode.

The second signal HS may be provided subsequently to the first signal LP. The second signal HS may be provided in the inactive period of the first signal LP. The second signal HS may include frame data. The second signal HS may be a high-speed differential signal. The second signal HS may have a second frequency, which may be higher than the first frequency F1. (Although the second signal HS is illustrated as a periodic pulse train in FIG. 11A, the second signal HS may have aperiodic pulses for conveying corresponding data, where the data rate may be proportional to or equal to the second frequency.) The second frequency may have a frequency ranging from 400 MHz to 500 MHz. The second signal HS may have a lower voltage than the first signal LP. The second signal HS may have a voltage of 100 mV to 300 mV.

The second signal HS may be referred to as a high frequency component of the data signal DATA. The period in which the second signal HS is transmitted may be referred to as a period of a high speed HS mode.

The data signal DATA may cause interference to the receive signal RS (see FIG. 10) through the interference capacitor CC (see FIG. 10). In this case, the second signal HS may be filtered by the sensor driver 200C.

In a conventional display device, the first signal LP may affect the analysis of the receive signal RS. However, according to the present disclosure, the host processor 1001 may receive driving information of the sensor layer 200 through the first communication line DTL. The driving information may include information on the transmit signal TS (see FIG. 10). The host processor 1001 may determine the first frequency F1 based on the frequency of the transmit signal TS and control the rising component (e.g., times of rising edges of pulses) and the falling component (e.g., times of falling edges of the pulses) of a low frequency component to offset the falling component and rising component, respectively, of the transmit signal in a specific sampling period of the receive signal RS. Alternatively, after sweeping the packet frequency of the data signal DATA over a range of packet frequencies and driving the sensor layer 200 to extract noise from the receive signal RS, the host processor 1001 may select, as a frequency of the low frequency component, one of a plurality of candidate frequencies having a noise level less than or equal to a predetermined threshold noise from among the noise levels at the packet frequencies for driving. Accordingly, noise of the receive signal RS may be reduced or removed (to a negligible amount), since the frame display frequency is adjusted to a frequency that avoids interference with sensing operations at a sensing circuit frequency. Accordingly, the electronic device 1000 with improved reliability may be provided.

Although FIG. 11A illustrates that the plurality of packets PK provided in one frame period FR have the same frequency, the frequency of each of the plurality of packets PK provided in one frame period FR according to an embodiment of the present disclosure is not limited thereto (where a "packet frequency" herein is a frequency with respect to an adjacent packet). For example, the first frequency F1 of a first packet may be 300 kHz, the first frequency F1 of a second packet may be 150 kHz, and the first frequency F1 of a third packet may be 600 KHz.

In addition, the plurality of packets PK may have various frequencies depending on frame periods FR. For example, the first frequency F1 of each of a plurality of packets PK at a first frame period FR may be 300 kHz, the first frequency F1 of each of the plurality of packets PK at a second frame period FR may be 150 kHz, and the first frequency F1 of each of a plurality of packets PK at a third frame period FR may be 300 KHz.

Figure 11B:
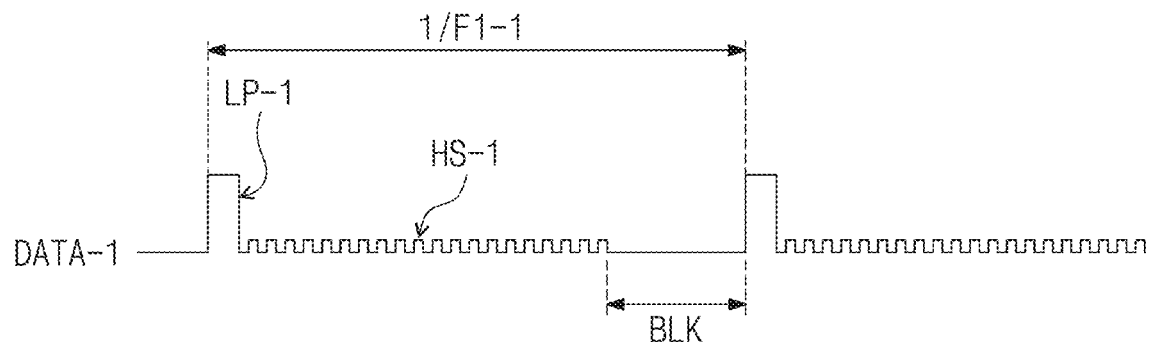
FIG. 11B illustrates a data signal according to an embodiment of the present disclosure.

FIG. 11B illustrates a data signal according to an embodiment of the present disclosure.

Referring to FIGS. 11A and 11B, a data signal DATA-1 may include a first signal LP-1 and a second signal HS-1.

The first signal LP-1 may not include frame data. The first signal LP-1 may have a frequency F1-1, which may be lower than the first frequency F1.

The second signal HS-1 may be provided subsequently to the first signal LP-1. The second signal HS-1 may be provided in the inactive period of the first signal LP-1. The second signal HS-1 may include frame data. The second signal HS-1 may have a higher frequency than the frequency F1-1.

When the first signal LP-1 is "operated at the frequency F1-1" (e.g., the first signal LP-1 is a pulse train with pulses repeating at the frequency F1-1), a blank period BLK, which is an inactive period, may be provided after the second signal HS-1 is provided. For example, the blanking period BLK may be referred to as a horizontal blanking period.

Figure 11C:
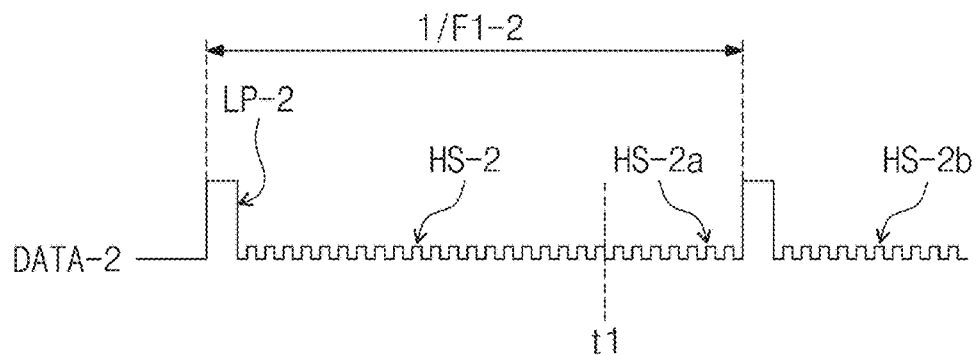
FIG. 11C illustrates a data signal according to an embodiment of the present disclosure.

FIG. 11C illustrates a data signal according to an embodiment of the present disclosure.

Referring to FIGS. 11A and 11C, a data signal DATA-2 may include a first signal LP-2 and second signals HS-2, HS-2a and HS-2b.

The first signal LP-2 may not include frame data. The first signal LP-2 may have a frequency F1-2. The frequency F1-2 may be lower than the first frequency F1. For example, the frequency F1-2 may be the same as the frequency F1-1 (see FIG. 11B).

The second signal HS-2 may be provided subsequent to a first pulse of the first signal LP-2. The second signal HS-2 may be provided in the inactive period of the first signal LP-2. The second signal HS-2 may include frame data. The second signal HS-2 may have a frequency higher than the frequency F1-2.

Second signals HS-2a and HS-2b may represent data included in the next frame data. The signal HS-2a may include a portion of the next frame data. The signal HS-2a may begin at a time t1 which is prior to a second pulse of the first signal LP-2. (The driving controller 100C may differentiate the signal HS-2a from the signal HS-2 based on a predetermined signal exchange or protocol with the host processor 1001 in which the driving controller 100C is informed that the signal HS-2a begins at time t1.) For example, the signal HS-2a may be provided during the blank period BLK (see FIG. 11B).

The signal HS-2b may include at least some of the remaining portion of the next frame data. The signal HS-2b may be provided after a third pulse of the first signal LP-2.

Figure 11D:
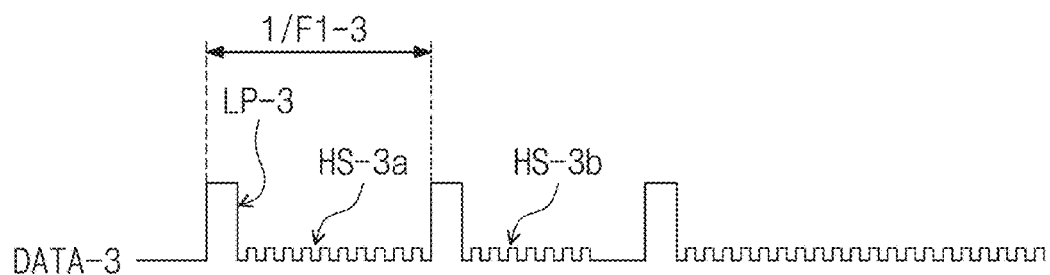
FIG. 11D illustrates a data signal according to an embodiment of the present disclosure.

FIG. 11D illustrates a data signal according to an embodiment of the present disclosure.

Referring to FIGS. 11A and 11D, a data signal DATA-3 may include a first signal LP-3 and second signals HS-3a and HS-3b.

The first signal LP-3 may not include frame data. The first signal LP-3 may have a frequency F1-3, which may be higher than the first frequency F1.

Second signals HS-3a and HS-3b may each have a frequency higher than the frequency F1-3.

The signal HS-3a may include a portion of frame data of a first frame. The signal HS-3a may be provided subsequent to a first pulse of the signal LP-3. The signal HS-3a may be provided in the inactive period of the first signal LP-3.

The signal HS-3b may include at least some of the remaining portion of the frame data for the first frame. The signal HS-3b may be provided after the second pulse of the signal LP-3.

Figure 11E:
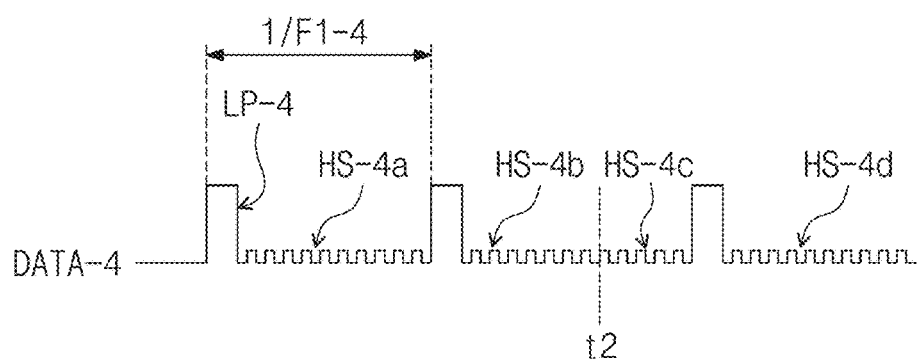
FIG. 11E illustrates a data signal according to an embodiment of the present disclosure.

FIG. 11E illustrates a data signal according to an embodiment of the present disclosure.

Referring to FIGS. 11A and 11E, a data signal DATA-4 may include a first signal LP-4 and second signals HS-4a, HS-4b, HS-4c, and HS-4d.

The first signal LP-4 may not include frame data. The first signal LP-4 may have a frequency F1-4. The frequency F1-4 may be higher than the first frequency F1. For example, the frequency F1-4 may be the same as the frequency F1-3 (see FIG. 11D).

The second signals HS-4a, HS-4b, HS-4c and HS-4d may each have a frequency higher than the frequency F1-4.

The signal HS-4a may include a portion of frame data of a first frame. The signal HS-4a may be provided subsequent to a first pulse of the first signal LP-4. The signal HS-4a may be provided in the inactive period of the first signal LP-4.

The signal HS-4b may include at least some of the remaining portion of the frame data of the first frame. The signal HS-4b may be provided after a second pulse of the first signal LP-4.

The second signals HS-4c and HS-4d may include next frame data.

The signal HS-4c may include a portion of the next frame data. The signal HS-4c may be provided at a time t2, which is after the signal HS-4b. The signal HS-4c may be interposed between a first signal provided secondarily and a first signal provided thirdly after the second first signal.

The signal HS-4d may include at least some of the remaining portion of the next frame data. The signal HS-4d may be provided after a third pulse of the first signal LP-4.

Figure 12A:
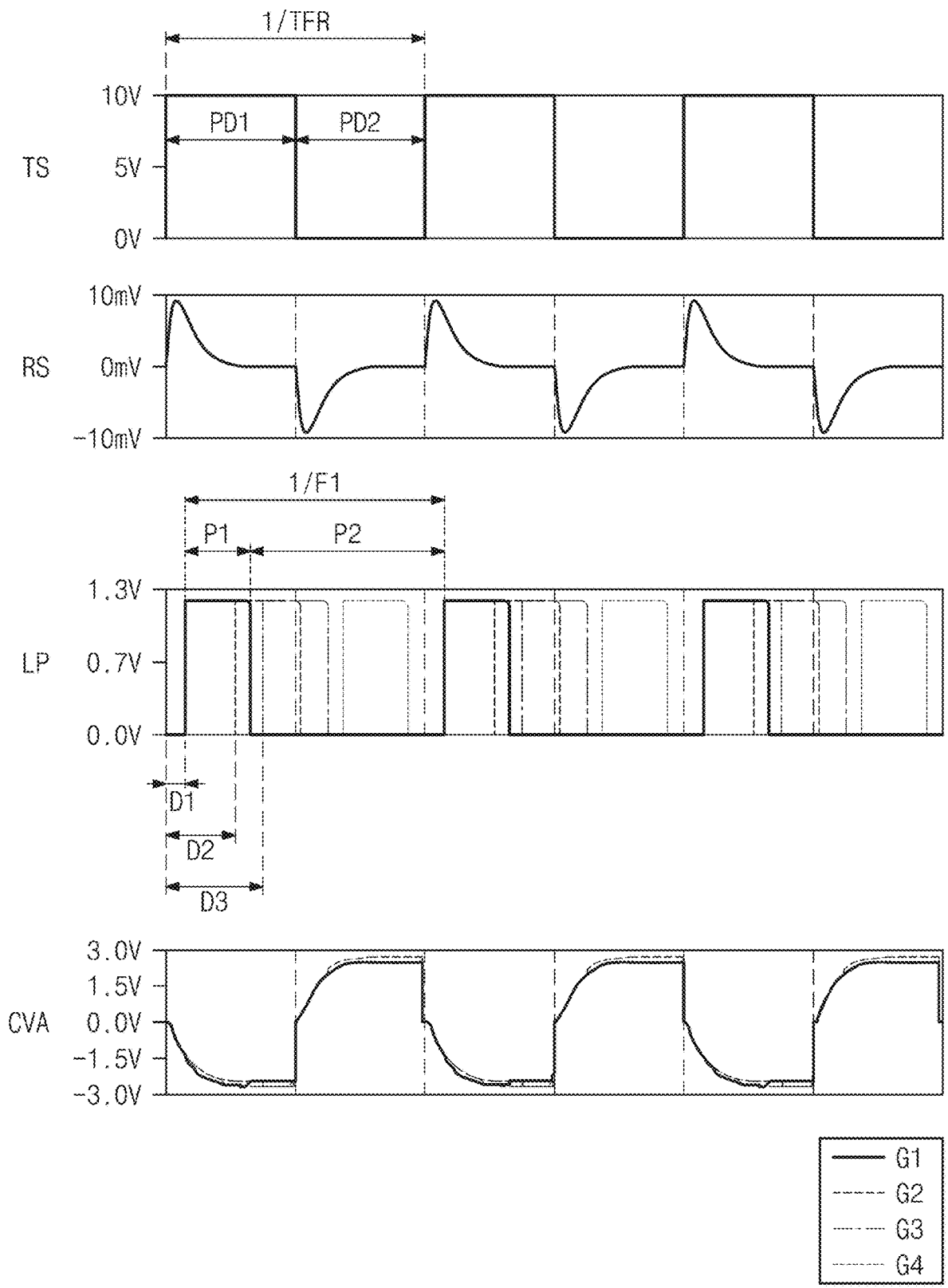
FIG. 12A is a timing diagram illustrating signals according to an embodiment of the present disclosure.

FIG. 12A is a timing diagram illustrating signals according to an embodiment of the present disclosure.

In FIG. 12A, a horizontal axis may indicate time, and a vertical axis may indicate signal strength.

Referring to FIGS. 2, 10, and 12A, the sensor driver 200C may output the transmit signal TS to the plurality of first sensing electrodes TE1 (see FIG. 7) of the sensor layer 200.

The transmit signal TS may have a first level during a first transmit period PD1, and may have a second level during a second transmit period PD2 subsequent to the first transmit period PD1. The second level may be lower than the first level. For example, the first level may be 10 V, and the second level may be 0 V. However, this is provided only for the illustrative purpose, and the voltage of each signal is not limited thereto, but may be provided in various ways.

The first transmit period PD1 may be referred to as a positive sampling period, and the second transmit period PD2 may be referred to as a negative sampling period.

The transmit signal TS may have a sensing frequency TFR. The sensing frequency TFR may be referred to as a third frequency. The first transmit period PD1 and the second transmit period PD2 may be repeated at the sensing frequency TFR.

The sensor driver 200C may receive the receive signal RS from the plurality of second sensing electrodes TE2 (see FIG. 7) of the sensor layer 200.

The data signal DATA may include the first signal LP. The electronic device 1000 may output the first signal LP under a first condition G1 or a fourth condition G4. A conventional electronic device may output the first signal LP under a second condition G2 or a third condition G3. The first to fourth conditions G1, G2, G3, and G4 may be classified according to the rising time point of the active section of the first signal LP (time point of a rising edge of a pulse of the first signal LP) and a falling time point of the active section (time point of a falling edge of a pulse of the first signal LP).

The first condition G1 and the fourth condition G4 employ a driving method of the electronic device 1000 according to an embodiment of the present disclosure, and the second condition G2 and the third condition G3 employ a conventional driving method of the electronic device different from that of the present disclosure. In an example, the capacitance of the interference capacitor CC may be 300 fF (femtofarad) for all the conditions G1-G4 in the example of FIG. 12A.

Under the first condition G1, the first signal LP may be delayed by a first time D1 from the rising time point of the transmit signal TS in the first transmit period PD1. The first time D1 may be 0.25 μs (microseconds).

The first signal LP may have a third level during a first period P1 and may have a fourth level during a second period P2 following the first period P1. The fourth level may be lower than the third level. The first period P1 may be an active period of the first signal LP, and the second period P2 may be an inactive period of the first signal LP. For example, the third level may be 1.2 V, and the fourth level may be 0 V. However, this is provided only for the illustrative purpose, and the voltage of each signal is not limited thereto. For example, the voltage of each signal is provided in various ways.

The first signal LP may have the first frequency F1 (in other words, pulses of the first signal LP are repetitive at the frequency F1). The first period P1 and the second period P2 may be repeated at the first frequency F1.

Each of the width of the first transmit period PD1 and the width of the second transmit period PD2 may be wider than the width of the first period P1. The first transmit period PD1 may completely overlap the first period P1.

According to the present disclosure, in the first period P1, the rising time point (the time point of the rising edge) and the falling time point (the time point of the falling edge) of one pulse of the first signal LP may occur during the first transmit period PD1 of one cycle of the transmit signal TS (where one cycle has a duration of 1/TFR). Accordingly, the rising and falling components of the first signal LP, which is an interference signal propagating through the interference capacitor CC, may be dependent on the first transmit period PD1, which is a specific sampling period. Noise due to the rising component and the falling component may cancel each other to be removed within the specific sampling period. In other words, noise may be reduced or removed. Sensitivity may be improved by increasing the signal to noise ratio (SNR) of the detection voltage CVA. Accordingly, the electronic device 1000 with improved sensing reliability may be provided.

The host processor 1001 (see FIG. 2) may determine the first frequency F1 based on the sensing frequency TFR. In the first condition G1, the first frequency F1 may be the same as the sensing frequency TFR. For example, the first frequency F1 may be 300 KHz.

According to the present disclosure, the first frequency F1 may be a divisor of the sensing frequency TFR. In other words, the sensing frequency TSR may be an integer multiple of the first frequency F1. Therefore, even if the transmit signal TS and the first signal LP are repeated at each of the sensing frequency TFR and the first frequency F1, the rising component and the falling component of the first signal LP may each fall within the first transmit period PD1 for each pulse of the first signal LP. Noise due to the rising component and the falling component may cancel each other to be removed within the specific sampling period. In other words, noise may be reduced or removed. Sensitivity may be improved by increasing a signal to noise ratio (SNR). Accordingly, the electronic device 1000 with improved sensing reliability may be provided.

Under the second condition G2, the first signal LP may be delayed by a second time D2 from the rising time point of the transmit signal TS in the first transmit period PD1. The second time D2 may be 0.75 μs. The first transmit period PD1 may not completely overlap the active period of the first signal LP (the time of a first signal LP pulse). The active period of the first signal LP may overlap both the first transmit period PD1 and the second transmit period PD2.

Under the third condition G3, the first signal LP may be delayed by a third time D3 from the rising time point of the transmit signal TS in the first transmit period PD1. The third time D3 may be 1.25 μs. The first transmit period PD1 may not completely overlap the active period of the first signal LP. The active period of the first signal LP may overlap both the first transmit period PD1 and the second transmit period PD2.

Under the fourth condition G4, each of the width of the first transmit period PD1 and the width of the second transmit period PD2 may be wider than the width of the active period of the first signal LP. The second transmit period PD2 may overlap the first period P1.

According to the present disclosure, the rising time point and the falling time point of the active period of the first signal LP may overlap one second transmit period PD2. Accordingly, the rising and falling components of the first signal LP, which is an interference signal propagating through the interference capacitor CC, may fall within the second transmit period PD2, which is a specific sampling period. The rising component and the falling component may be offset and removed from each other within the specific sampling period. In other words, noise may be reduced or removed. Sensitivity may be improved by increasing a signal to noise ratio (SNR) of the detection voltage CVA. Accordingly, the electronic device 1000 with improved sensing reliability may be provided.

The sensor driver 200C may output the detection voltage CVA based on the receive signal RS received from the sensor layer 200 and may output the coordinate signal I-SS based on the detection voltage CVA. The sensor driver 200C may provide the coordinate signal I-SS to the host processor 1001.

The coordinate signal I-SS may have a specific value. For example, under the first to fourth conditions G1, G2, G3, and G4, the coordinate signal I-SS may have a value of about 25 voltage units. In this case, when the signal-to-noise ratio (SNR) is measured for each of the first to fourth conditions G1, G2, G3, and G4, the SNR of 40 dB (decibel) or more may be determined as being normal, and the SNR of less than 40 dB may be determined as being defective.

In a conventional electronic device, the noise level may have a value of about 9 voltage units under the second condition G2. In this case, the signal-to-noise ratio may have a value of 8.9 dB (calculated based on 25/9=2.78). The noise may have a value of about 18 under the third condition G3. In this case, the signal-to-noise ratio may have a value of 2.8 dB. Since the signal-to-noise ratio (SNR) is less than 40 dB in each of the second condition G2 and the third condition G3, in this case the SNR may be determined as defective. However, according to the present disclosure, noise due to the rising and falling components of the first signal LP may cancel each other within a specific sampling period under the first and fourth conditions G1 and G4. The noise may be about 0.002 under the first condition G1. In this case, the signal-to-noise ratio may have a value of 81.9 dB (calculated based on 25/.002=12,500). Since the signal-to-noise ratio (SNR) is 40 dB or more in the first condition G1, the SNR may be determined as normal. Accordingly, the electronic device 1000 with improved reliability may be provided.

Figure 12B:
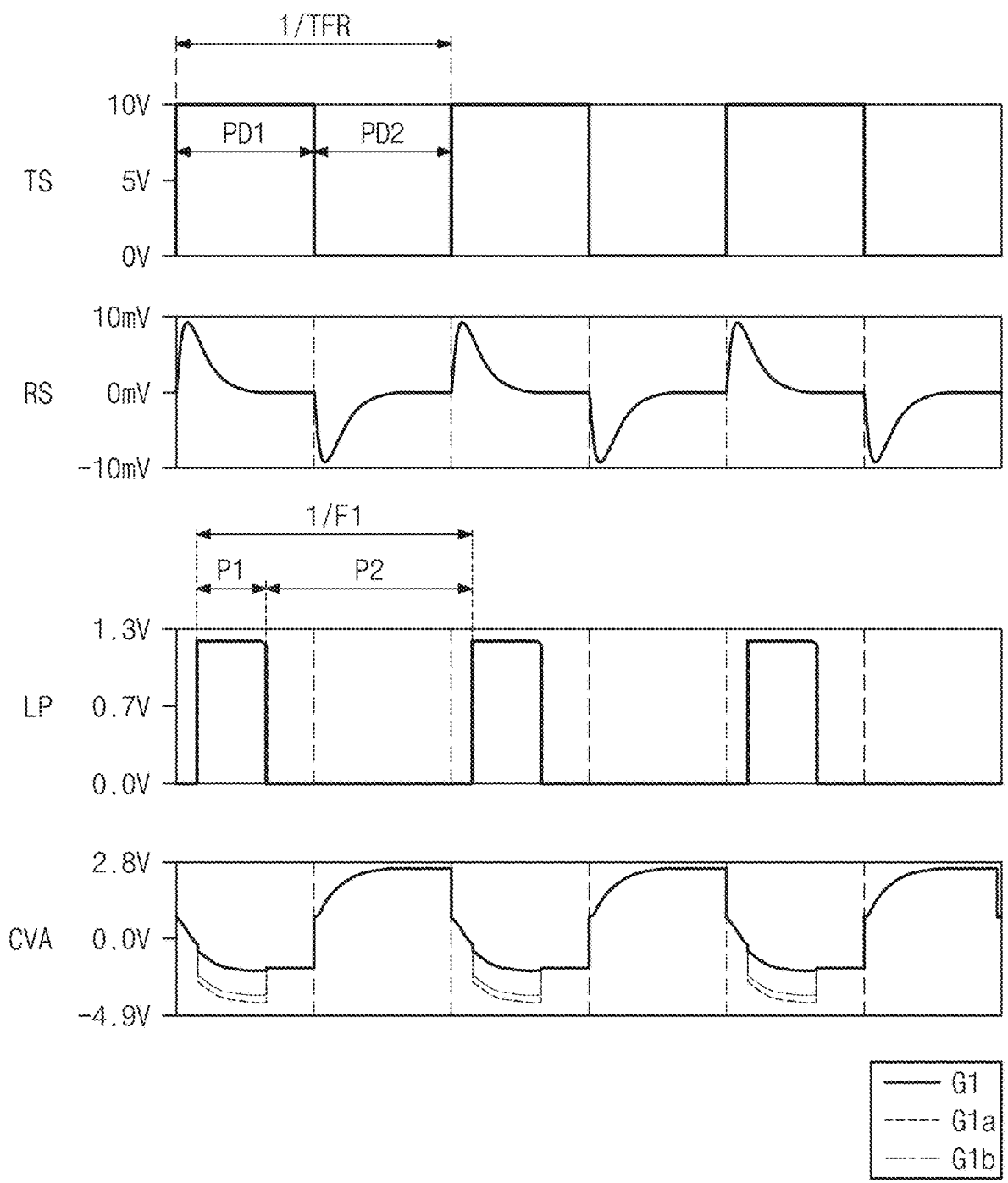
FIG. 12B is a timing diagram illustrating signals according to an embodiment of the present disclosure.

FIG. 12B is a timing diagram illustrating signals according to an embodiment of the present disclosure. In the following description made with FIG. 12B, the same reference numerals are assigned to the same components described with reference to FIG. 12A, and the details thereof are omitted.

Referring to FIGS. 2, 10, and 12B, the data signal DATA may include the first signal LP. The electronic device 1000 (see FIG. 1) may output signals measured under the first condition G1, a second condition G1a, and a third condition G1b. These conditions may be classified based on capacitance of the interference capacitor CC.

The first to third conditions G1, G1a, and G1b employ a driving method of the electronic device 1000 according to an embodiment of the present disclosure. The interference capacitor CC may have a different capacitance under the first to third conditions G1, G1a, and G1b.

The capacitance of the interference capacitor CC may be 300 fF (femtofarad) under the first condition G1.

Under the second condition G1a, the first signal LP may include the first period P1 and the second period P2. The first period P1 may be an active period of the first signal LP, and the second period P2 may be an inactive period of the first signal LP.

The first signal LP may have the first frequency F1. Each of the width of the first transmit period PD1 and the width of the second transmit period PD2 may be wider than the width of the first period P1. The first transmit period PD1 may completely overlap the first period P1.

Under the second condition G1a, the capacitance of the interference capacitor CC may be 2400 fF.

According to the present disclosure, the rising time point and the falling time point of the first period P1 may fall within one first transmit period PD1. Accordingly, the rising and falling components of the first signal LP, which is an interference signal transmitted by the interference capacitor CC, may fall within the first transmit period PD1, which is a specific sampling period. Noise due to the rising component and the falling component may cancel each other within the specific sampling period. In other words, noise may be reduced or removed. Sensitivity may be improved by increasing a signal to noise ratio (SNR). Accordingly, the electronic device 1000 with improved sensing reliability may be provided.

Under the third condition G1b, the first signal LP may include the first period P1 and the second period P2. The first period P1 may be an active period of the first signal LP, and the second period P2 may be an inactive period of the first signal LP.

The first signal LP may have the first frequency F1. Each of the width of the first transmit period PD1 and the width of the second transmit period PD2 may be wider than the width of the first period P1. The first transmit period PD1 may overlap the first period P1.

The capacitance of the interference capacitor CC may be 3000 fF under the third condition G1b.

According to the present disclosure, the rising time point and the falling time point of the first period P1 may overlap one first transmit period PD1. Accordingly, the rising and falling components of the first signal LP, which is an interference signal transmitted by the interference capacitor CC, may be dependent on the first transmit period PD1, which is a specific sampling period. Noise due to the rising component and the falling component may cancel each other within the specific sampling period. In other words, noise may be reduced or removed. Sensitivity may be improved by increasing a signal to noise ratio (SNR). Accordingly, the electronic device 1000 with improved sensing reliability may be provided.

The first signal LP under each of the second condition G1a and the third condition G1b may be substantially the same as the first signal LP under the first condition G1.

The sensor driver 200C may output the detection voltage CVA based on the receive signal RS received from the sensor layer 200 and may output the coordinate signal I-SS based on the detection voltage CVA. The sensor driver 200C may provide the coordinate signal I-SS to the host processor 1001.

The coordinate signal I-SS may have a specific value. For example, under the first to third conditions G1, G1a, and G1b, the coordinate signal I-SS may have a value of about 25.

According to the present disclosure, under the first to third conditions G1, G1a, and G1b, noise due to the rising component and the falling component of the first signal LP may cancel each other within a specific sampling period. The noise may be about 0.002 under the first condition G1. In this case, the signal-to-noise ratio may have a value of 81.9 dB. The noise may be about 0.032 under the second condition G1a. In this case, the signal-to-noise ratio may have a value of 57.9 dB. The noise may be about 0.035 under the third condition G1b. In this case, the signal-to-noise ratio may have a value of 57.0 dB. Since the signal-to-noise ratio is 40 dB or more under the first to third conditions G1, G1a, and G1b, in this case the SNR may be determined as being normal. Accordingly, the electronic device 1000 with improved reliability may be provided.

Figure 12C:
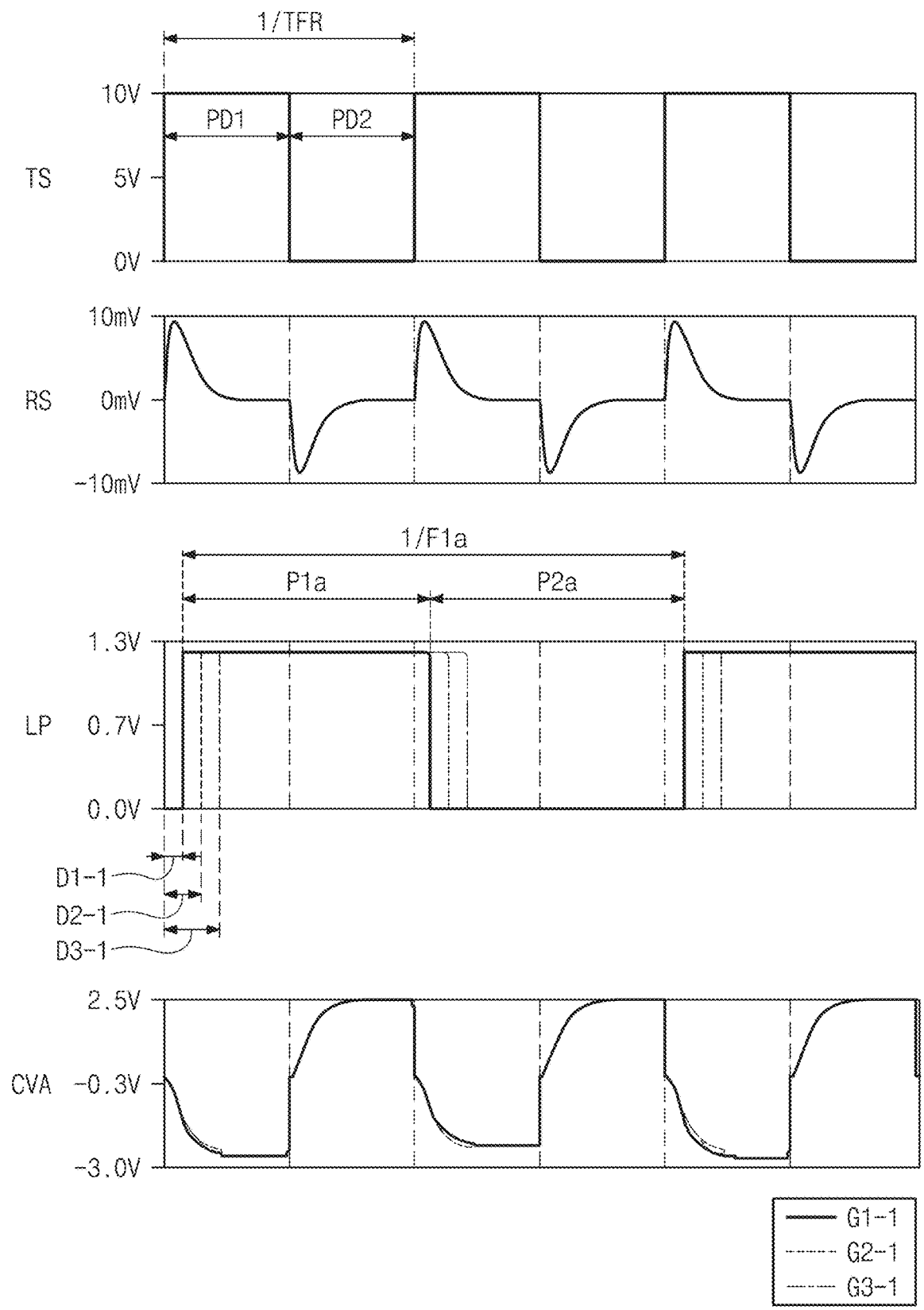
FIG. 12C is a timing diagram illustrating signals according to an embodiment of the present disclosure.

FIG. 12C is a timing diagram illustrating signals according to an embodiment of the present disclosure. In the following description made with reference to FIG. 12C, the same reference numerals will be assigned the same components described with reference to FIG. 12A, and the details thereof will be omitted.

Referring to FIGS. 2, 10, and 12C, the data signal DATA may include the first signal LP. The electronic device 1000 may output the first signal LP measured under a first condition G1-1, a second condition G2-1, and a third condition G3-1. The first to third conditions G1-1, G2-1, and G3-1 may be classified according to the rising time point of the active period of the first signal LP.

The first to third conditions G1-1, G2-1, and G3-1 employ a driving method of the electronic device 1000 according to an embodiment of the present disclosure. In this example, the capacitance of the interference capacitor CC may be 300 fF (femtofarad) for each of the conditions G1-1, G2-1 and G3-1.

Under the first condition G1-1, the first signal LP may be delayed by a first time D1-1 from the rising time point of the first transmit period PD1. The first time D1-1 may be 0.25 μs (microseconds).

The first signal LP may include a first period P1a and a second period P2a. The second period P2a may be subsequent to the first period P1a. The first period P1a may be an active period of the first signal LP, and the second period P2a may be an inactive period of the first signal LP.

The first signal LP may have a first frequency F1a. The first period P1a and the second period P2a may be repeated at the first frequency F1a.

A plurality of first transmit periods PD1 may be provided. (In other words, the first transmit periods PD1 are repetitive.) Two consecutive first transmit periods PD1, together with one second transmit period PD2 interposed therebetween, may completely overlap the first period P1a.

According to the present disclosure, the rising time point of the first period P1a may fall within one of the two first transmit periods PD1, and the falling time point of the first period P1a may fall within the remaining one of the two first transmit periods PD1. For this reason, the rising and falling components of the first signal LP, which is an interference signal propagating through the interference capacitor CC, may fall within consecutive first transmit periods PD1, which are specific sampling periods. In addition, an even number of first transmit periods PD1 overlapping the first period P1a may be provided. Accordingly, noise due to the rising component and the falling component may cancel each other within the specific sampling period. In other words, noise may be reduced or removed. Sensitivity may be improved by increasing a signal to noise ratio (SNR). Accordingly, the electronic device 1000 with improved sensing reliability may be provided.

The host processor 1001 (see FIG. 2) may determine the first frequency F1a based on the sensing frequency TFR. Under the first condition G1-1, the first frequency F1a may be lower than the sensing frequency TFR. For example, the sensing frequency TFR may be 300 kHz, and the first frequency F1a may be 150 kHz.

According to the present disclosure, the first frequency F1a may have a divisor of the sensing frequency TFR. Therefore, even if the transmit signal TS and the first signal LP are repeated at each of the sensing frequency TFR and the first frequency F1a, the rising component and the falling component of the first signal LP may be dependent within an even number of first transmit periods PD1. The rising component and the falling component may be offset and removed from each other within the specific sampling period. In other words, noise may be reduced or removed. Sensitivity may be improved by increasing a signal to noise ratio (SNR). Accordingly, the electronic device 1000 with improved sensing reliability may be provided.

Under the second condition G2-1, the first signal LP may be delayed by a second time D2-1 from the rising time point of the first transmit period PD1. The second time D2-1 may be 0.50 μs.

A plurality of first transmit periods PD1 may be provided. Two consecutive first transmit periods PD1, together with one second transmit period PD2 interposed therebetween, may completely overlap the active period of the first signal LP.

According to the present disclosure, the rising time of the active period of the first signal LP may overlap one of the two first transmit periods PD1, and the falling time point of the active period of the first signal LP may overlap the remaining one of the two first transmit periods PD1. For this reason, the rising and falling components of the first signal LP, which is an interference signal transmitted by the interference capacitor CC, may be dependent on the first transmit periods PD1, which are specific sampling periods. In addition, an even number of first transmit periods PD1 overlapping the active period of the first signal LP may be provided. Accordingly, noise due to the rising component and the falling component may cancel each other within the specific sampling period. In other words, noise may be reduced or removed. Sensitivity may be improved by increasing a signal to noise ratio (SNR). Accordingly, the electronic device 1000 with improved sensing reliability may be provided.

Under the third condition G3-1, the first signal LP may be delayed by a third time D3-1 from the rising time point of the first transmit period PD1. The third time D3-1 may be 0.75 μs.

A plurality of first transmit periods PD1 may be provided. Two consecutive first transmit periods PD1, together with one second transmit period PD2 interposed therebetween, may completely overlap the active period of the first signal LP.

According to the present disclosure, the rising time point of the active period of the first signal LP may overlap one of the two first transmit periods PD1, and the falling time point of the active period of the first signal LP may overlap the remaining one of the two first transmit periods PD1. For this reason, the rising and falling components of the first signal LP, which is an interference signal transmitted by the interference capacitor CC, may be dependent on the first transmit periods PD1, which are specific sampling periods. In addition, an even number of first transmit periods PD1 overlapping the active period of the first signal LP may be provided. Accordingly, the rising component and the falling component may be offset and removed from each other within the specific sampling period. In other words, noise may be reduced or removed. Sensitivity may be improved by increasing a signal to noise ratio (SNR). Accordingly, electronic device 1000 with improved sensing reliability may be provided.

The sensor driver 200C may output the detection voltage CVA based on the receive signal RS received from the sensor layer 200 and may output the coordinate signal I-SS based on the detection voltage CVA. The sensor driver 200C may provide the coordinate signal I-SS to the host processor 1001.

The coordinate signal I-SS may have a specific value. For example, under the first to third conditions G1, G1a, and G1b, the coordinate signal I-SS may have a value of about 25.

According to the present disclosure, under the first to third conditions G1-1, G2-1, and G3-1, the rising component and the falling component of the first signal LP may be offset and removed from each other within specific sampling periods. The noise may be about 0.0001 under the first condition G1-1. In this case, the signal-to-noise ratio may have a value of 102.4 dB. The noise may be about 0.001 under the second condition G2-1. In this case, the signal-to-noise ratio may have a value of 91.8 dB. The noise may be about 0.0001 under the third condition G3-1. In this case, the signal-to-noise ratio may have a value of 98.4 dB. Since the signal-to-noise ratio is 40 dB or more under the first to third conditions G1-1, G2-1, and G3-1, in this case the SNR may be determined as being normal. Accordingly, the electronic device 1000 with improved sensing reliability may be provided.

Figure 12D:
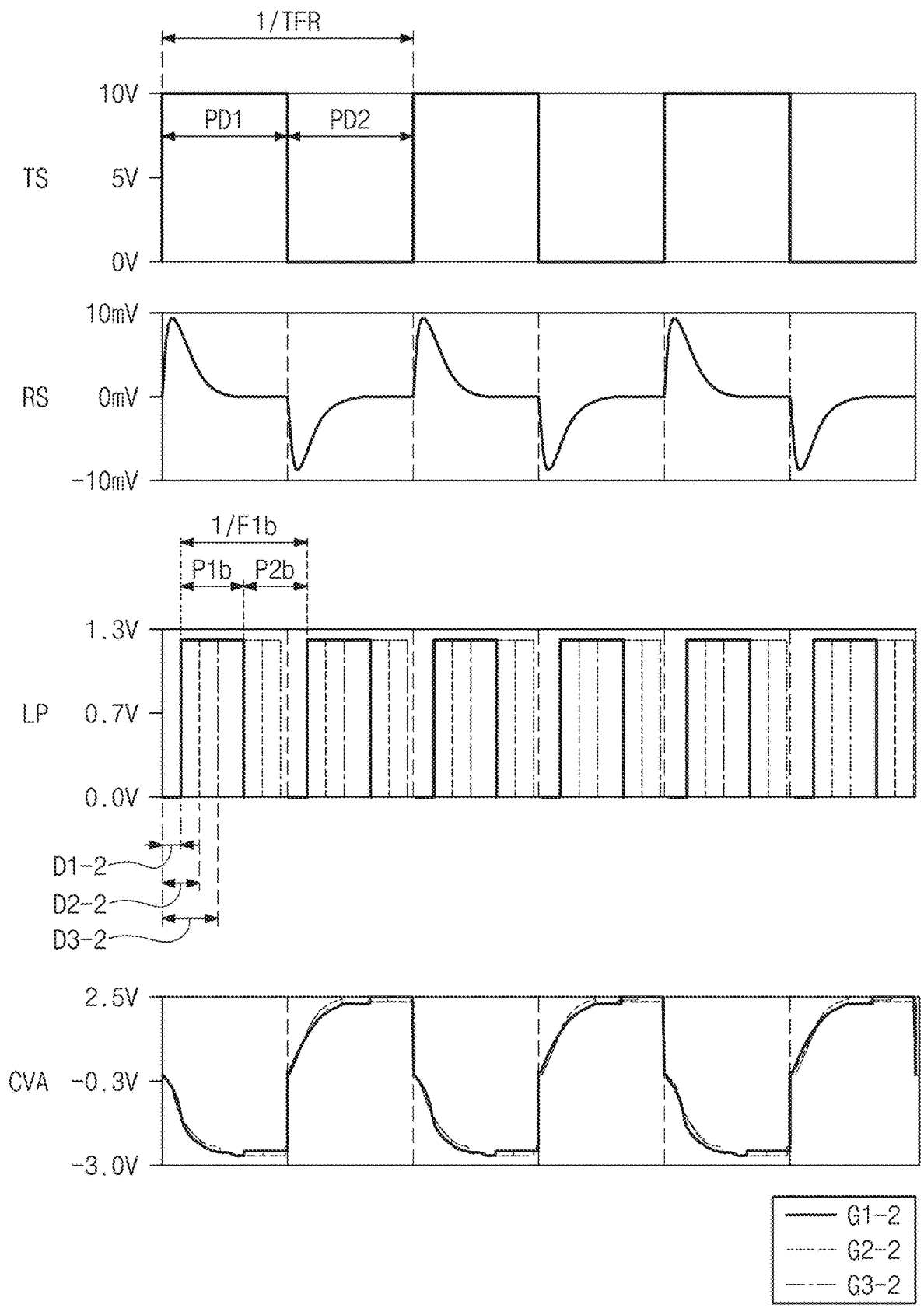
FIG. 12D is a timing diagram illustrating signals according to an embodiment of the present disclosure.

FIG. 12D is a timing diagram illustrating signals according to an embodiment of the present disclosure. In the following description made with reference to FIG. 12D, the same reference numerals will be assigned the same components described with reference to FIG. 12A, and the details thereof will be omitted.

Referring to FIGS. 2, 10, and 12D, the data signal DATA may include the first signal LP. The electronic device 1000 may output the first signal LP measured under a first condition G1-2, a second condition G2-2, and a third condition G3-2. The first to third conditions G1-2, G2-2, and G3-2 may be classified according to the rising time point of the active portion of the first signal LP.

The first to third conditions G1-2, G2-2, and G3-2 employ a driving method of the electronic device 1000 according to an embodiment of the present disclosure. In this case, the capacitance of the interference capacitor CC may be the same as 300 fF (femtofarad).

Under the first condition G1-2, the first signal LP may be delayed by a first time D1-2 from the rising time point of the first transmit period PD1. The first time D1-2 may be 0.25 μs (microseconds).

The first signal LP may include a first period P1b and a second period P2b. The second period P2b may be subsequent to the first period P1b. The first period P1b may be an active period of the first signal LP, and the second period P2b may be an inactive period of the first signal LP.

The first signal LP may have a first frequency F1b. The first period P1b and the second period P2b may be repeated at the first frequency F1b.

The width of the first transmit period PD1 and the width of the second transmit period PD2 may be wider than the width of the first period P1b. The first transmit period PD1 and the second transmit period PD2 may overlap the first period P1b.

According to the present disclosure, the rising time point and the falling time point of the first period P1b may overlap each of the first transmit period PD1 and the second transmit period PD2. Accordingly, the rising and falling components of the first signal LP, which is an interference signal transmitted by the interference capacitor CC, may be dependent on the first transmit period PD1 or the second transmit period PD2, which is a specific sampling period. Noise due to the rising component and the falling component may cancel each other within the specific sampling period. In other words, noise may be reduced or removed. Sensitivity may be improved by increasing a signal to noise ratio (SNR). Accordingly, the electronic device 1000 with improved sensing reliability may be provided.

The host processor 1001 (see FIG. 2) may determine the first frequency F1b based on the sensing frequency TFR. In the first condition G1-2, the first frequency F1b may be higher than the sensing frequency TFR. For example, the sensing frequency TFR may be 300 kHz, and the first frequency F1b may be 600 KHz.

According to the present disclosure, the first frequency F1b may have a multiple of a divisor of the sensing frequency TFR. Therefore, even if the transmit signal TS and the first signal LP are repeated at each of the sensing frequency TFR and the first frequency F1b, the rising component and the falling component of the first signal LP may be dependent on the first transmit period PD1 or the second transmit period PD2. Noise due to the rising component and the falling component may cancel each other within the specific sampling period. In other words, noise may be reduced or removed. Sensitivity may be improved by increasing a signal to noise ratio (SNR). Accordingly, the electronic device 1000 with improved sensing reliability may be provided.

Under the second condition G2-2, the first signal LP may be delayed by a second time D2-2 from the rising time point of the first transmit period PD1. The second time D2-2 may be 0.50 μs.

Each of the first transmit period PD1 and the second transmit period PD2 may overlap an active period of the first signal LP.

According to the present disclosure, the rising time point and the falling time point of the active period of the first signal LP may overlap each of the first transmit period PD1 and the second transmit period PD2. Accordingly, the rising and falling components of the first signal LP, which is an interference signal transmitted by the interference capacitor CC, may be dependent on the first transmit period PD1 or the second transmit period PD2, which is a specific sampling period. The rising component and the falling component may be offset and removed from each other within the specific sampling period. In other words, noise may be reduced or removed. Sensitivity may be improved by increasing a signal to noise ratio (SNR). Accordingly, the electronic device 1000 with improved sensing reliability may be provided.

Under the third condition G3-2, the first signal LP may be delayed by a third time D3-2 from the rising time point of the first transmit period PD1. The third time D3-2 may be 0.75 μs.

The first transmit period PD1 and the second transmit period PD2 may overlap the active period of the first signal LP.

According to the present disclosure, the rising time point and the falling time point of the active period of the first signal LP may overlap each of the first transmit period PD1 and the second transmit period PD2. Accordingly, the rising and falling components of the first signal LP, which is an interference signal transmitted by the interference capacitor CC, may be dependent on the first transmit period PD1 or the second transmit period PD2, which is a specific sampling period. Noise due to the rising component and the falling component may cancel each other within the specific sampling period. In other words, noise may be reduced or removed. Sensitivity may be improved by increasing a signal to noise ratio (SNR). Accordingly, the electronic device 1000 with improved sensing reliability may be provided.

The sensor driver 200C may output the detection voltage CVA based on the receive signal RS received from the sensor layer 200 and may output the coordinate signal I-SS based on the detection voltage CVA. The sensor driver 200C may provide the coordinate signal I-SS to the host processor 1001.

The coordinate signal I-SS may have a specific value. For example, under the first to third conditions G1-2, G2-2, and G3-2, the coordinate signal I-SS may have a value of about 25.

According to the present disclosure, under the first to third conditions G1-2, G2-2, and G3-2, the rising component and the falling component of the first signal LP may be offset and removed from each other within specific sampling periods. The noise may be about 0.001 under the first condition G1-2. In this case, the signal-to-noise ratio may have a value of 93.8 dB. The noise may be about 0.001 under the second condition G2-2. In this case, the signal-to-noise ratio may have a value of 87.4 dB. The noise may be about 0.001 under the third condition G3-1. In this case, the signal-to-noise ratio may have a value of 88.8 dB. Since the signal-to-noise ratio is 40 dB or more under the first to third conditions G1-2, G2-2, and G3-2, the SNR may be determined as being normal. Accordingly, the electronic device 1000 with improved sensing reliability may be provided.

Figure 13A:
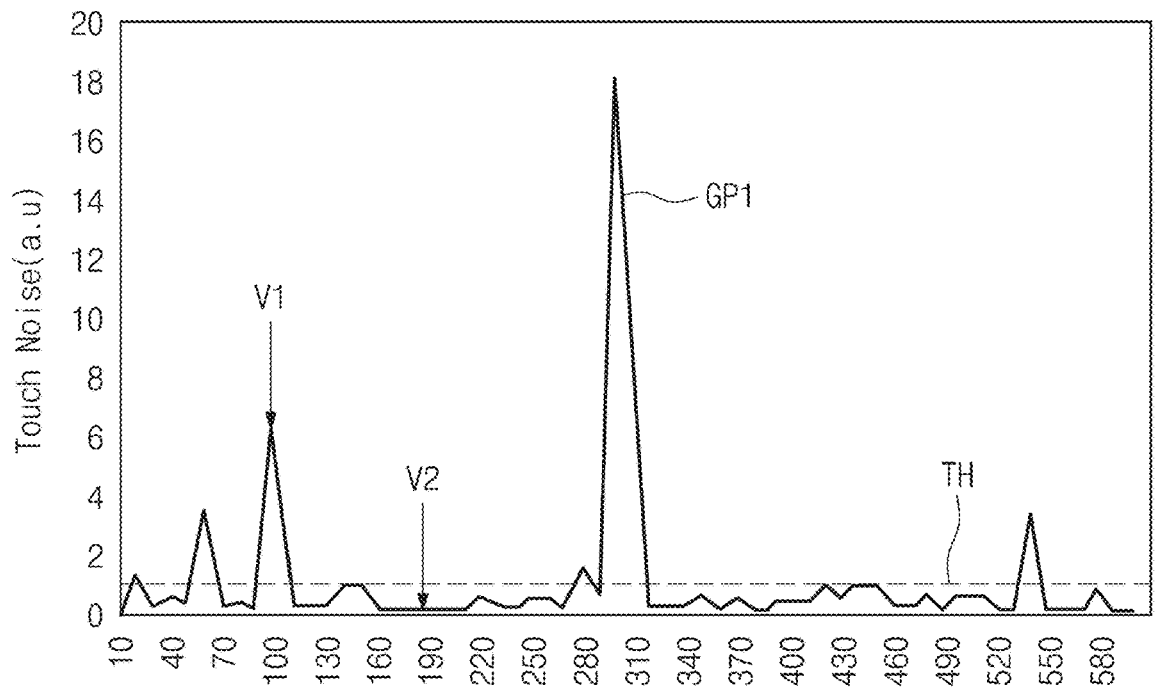
FIG. 13A is a graph illustrating noise for each packet frequency according to an embodiment of the present disclosure.

FIG. 13A is a graph illustrating noise for each packet frequency according to an embodiment of the present disclosure.

In FIG. 13A, a horizontal axis may indicate a packet frequency, and a vertical axis may indicate a noise level. In this case, "a.u" may refer to a measured value of a noise level with an arbitrary unit.

Referring to FIGS. 2, 10, 11A, and 13A, the host processor 1001 may sweep a packet frequency sequential packets PK and drive the sensor layer 200 to measure noise in the receive signal RS. The packet frequency may be substantially equal to the first frequency F1 of the first signal LP.

An example of noise measured for each packet frequency is illustrated through a first graph GP1. The first graph GP1 shows noise for each packet frequency when the duty ratio, which is a ratio between an active period and the period for one cycle (the inactive period plus the active period) of the first signal LP is 0.5, at a fixed sensing frequency TFR the capacitance of the interference capacitor CC is 300 fF, and the sensing frequency TFR is fixed.

The noise level for each packet frequency may be stored in the memory 1300 (see FIG. 1). The memory 1300 (see FIG. 1) may include a flash memory. In other words, at least some of the values corresponding to the first graph GP1 may be stored in the memory 1300 (see FIG. 1).

The host processor 1001 may determine a plurality of candidate frequencies V2 at which the noise level is less than or equal to a predetermined threshold noise TH. The threshold noise TH may be a preset value based on a malfunction of the sensor layer 200. In an example, the threshold noise TH may be defined as noise at 40 dB when calculating the signal to noise ratio (SNR) for a specific coordinate signal I-SS. In this case, the coordinate signal I-SS may have a value of about 25 (e.g., arbitrary voltage or power units).

The host processor 1001 may select one of the plurality of candidate frequencies V2 as the first frequency F1.

The host processor 1001 may output the data signal DATA including the first signal LP having the selected first frequency F1 to the driving controller 100C.

In a conventional electronic device that is driven with the first signal LP having the first frequency V1 having a noise level greater than the predetermined threshold noise TH, noise generated by the interference capacitor CC may affect the interpretation of the receive signal RS. However, according to the present disclosure, after sweeping the packet frequency of the data signal DATA over a range of packet frequencies and driving the sensor layer 200 to measure noise from the receive signal RS, the host processor 1001 may select one of the plurality of candidate frequencies V2 at which noise is less than or equal to a predetermined threshold noise TH, as the first frequency F1 of the first signal LP. Accordingly, noise of the receive signal RS may be removed to a negligible level or reduced to below a predetermined threshold. Sensitivity may be improved by increasing the signal-to-noise ratio. Accordingly, the electronic device 1000 with improved sensing reliability may be provided.

In an example, one of the plurality of candidate frequencies V2 in the first graph GP1 may be 180 kHz. In this case, the signal-to-noise ratio may have a value of 69.2 dB. When driven using any of the plurality of candidate frequencies V2 at which the noise level is below the threshold TH, since the signal-to-noise ratio (SNR) is 40 dB or more, the SNR may be determined as normal.

FIG. 13A illustrates that the electronic device 1000 is driven at 180 kHz of the plurality of candidate frequencies V2, but the frequency of each of the plurality of packets PK provided in one frame period FR according to an embodiment of the present disclosure is not limited thereto. For example, the first frequency F1 of a first packet may be 180 kHz, which is one of the plurality of candidate frequencies V2, the first frequency F1 of a second packet may be another of the plurality of candidate frequencies V2, and the first frequency F1 of a third packet may be another of the plurality of candidate frequencies V2 (where the frequency of any of packet is a frequency with respect to an adjacent packet).

In addition, the plurality of packets PK may have different frequencies for frame periods FR. For example, the first frequency F1 of each of the plurality of packets PK for the first frame period FR may be 180 kHz, which is one of the plurality of candidate frequencies V2, the first frequency F1 of each of a plurality of packets PK for the second frame period FR may be another of the plurality of candidate frequencies V2, and the first frequency F1 of each of a plurality of packets PK for the third frame period FR may be another one of the plurality of candidate frequencies V2.

When the sensor driver 200C is reset or driving information is changed after the host processor 1001 is booted or OS updated, the host processor 1001 may re-measure noise for each packet frequency.

Figure 13B:
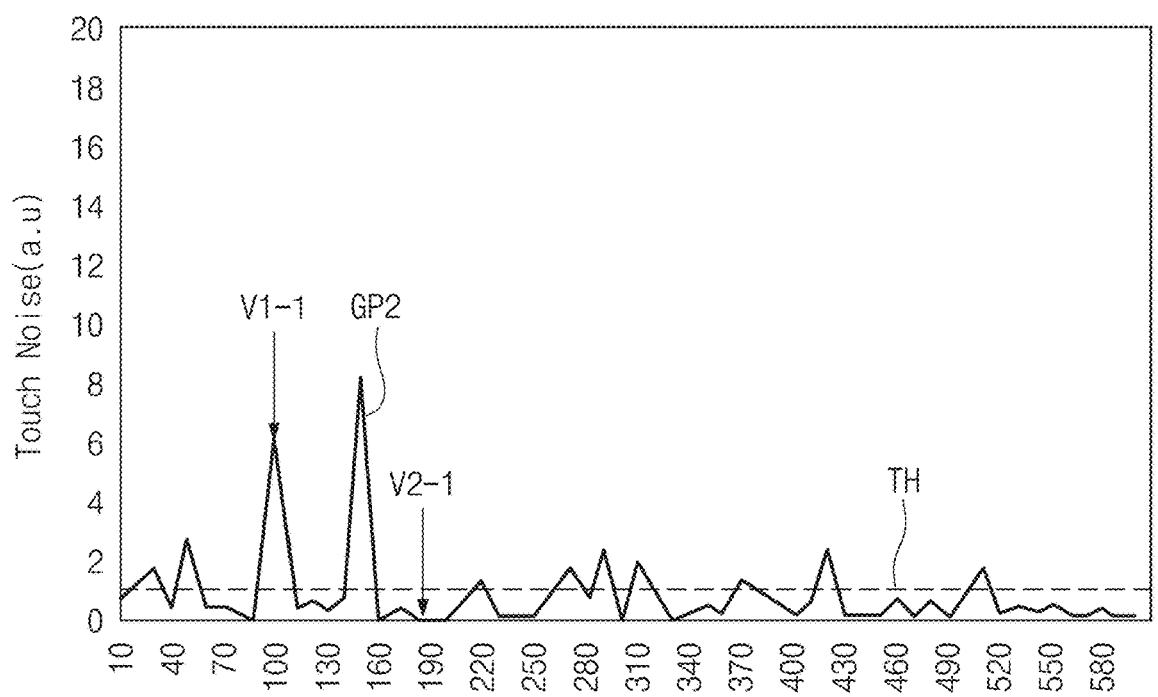
FIG. 13B is a graph illustrating noise for each packet frequency according to an embodiment of the present disclosure.

FIG. 13B is a graph illustrating noise for each packet frequency according to an embodiment of the present disclosure. In the following description made with reference to FIG. 13B, the same reference numerals will be assigned the same components described with reference to FIG. 13A, and the details thereof will be omitted.

Referring to FIGS. 2, 10, 11A, and 13B, the extracted noise for each packet frequency may be expressed through a second graph GP2. The second graph GP2 illustrates noise at each packet frequency when the duty ratio of the first signal LP is 0.25 and the capacitance of the interference capacitor CC is 300 fF.

When a conventional electronic device is driven with the first signal LP having the first frequency V1-1 having a noise level greater than a predetermined threshold noise level TH, from among noise for each packet frequency, noise caused by the interference capacitor CC may affect the analysis of the receive signal RS. However, according to the present disclosure, after sweeping the packet frequency of the data signal DATA and driving the sensor layer 200 to extract noise from the receive signal RS, the host processor 1001 may select one of a plurality of candidate frequencies V2-1 having noise having the predetermined threshold noise TH or less from noise for packet frequencies, as the first frequency F1 of the first signal LP. Accordingly, noise of the receive signal RS may be removed or reduced. Sensitivity may be improved by increasing the signal-to-noise ratio. Accordingly, the electronic device 1000 with improved sensing reliability may be provided.

One of the plurality of candidate frequencies V2-1 in the second graph GP2 may be 160 kHz. In this case, the signal-to-noise ratio may have a value of 93.9 dB. When the electronic device is driven using the plurality of candidate frequencies V2-1, since the signal-to-noise ratio (SNR) is 40 dB or more, in this case the SNR may be determined as being normal.

Figure 13C:
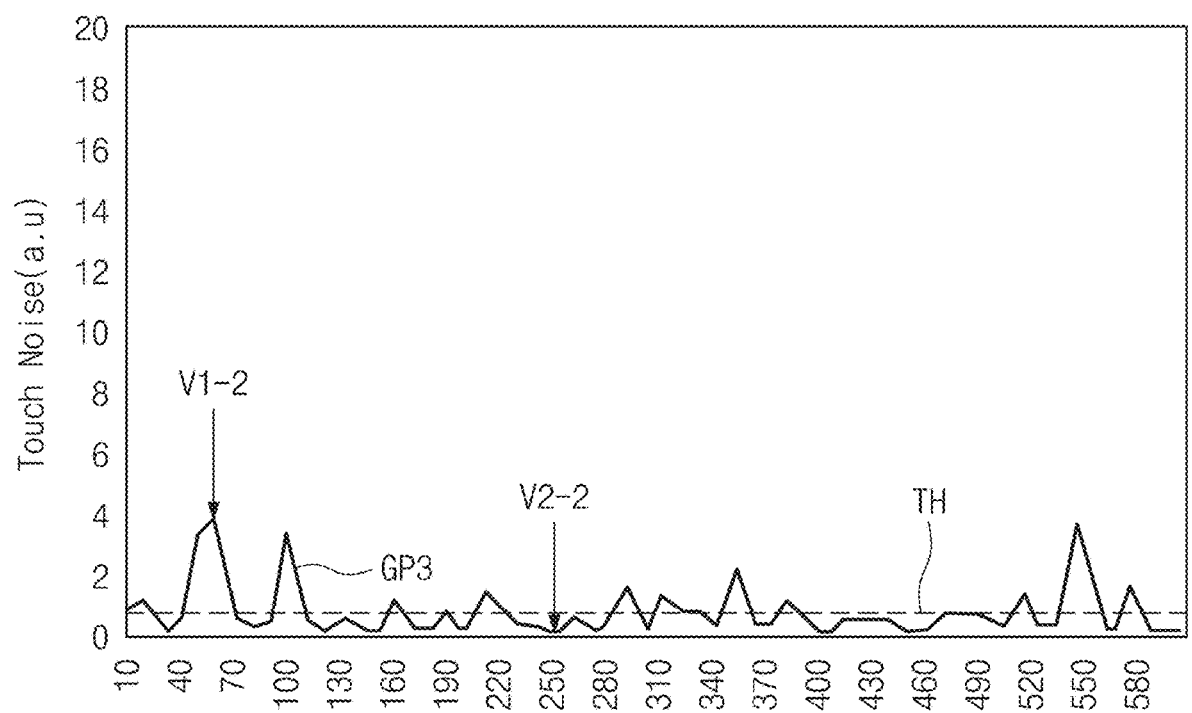
FIG. 13C is a graph illustrating noise for each packet frequency according to an embodiment of the present disclosure.

FIG. 13C is a graph illustrating noise for each packet frequency according to an embodiment of the present disclosure. In the following description made with reference to FIG. 13C, the same reference numerals will be assigned the same components described with reference to FIG. 13A, and the details thereof will be omitted.

Referring to FIGS. 2, 10, 11A, and 13C, the extracted noise for each packet frequency may be expressed THROUGH a third graph GP3. The third graph GP3 illustrates noise for each packet frequency when the duty ratio of the first signal LP is 0.125 and the capacitance of the interference capacitor CC is 300 fF.

When a conventional electronic device is driven with the first signal LP having the first frequency V1-2 having a noise level greater than the predetermined threshold noise level TH from among noise for packet frequencies, noise caused by the interference capacitor CC may affect the analysis of the receive signal RS. However, according to the present disclosure, after sweeping the packet frequency of the data signal DATA and driving the sensor layer 200 to extract noise from the receive signal RS, the host processor 1001 may select one of a plurality of candidate frequencies V2-2 having the predetermined threshold noise TH or less from among noise for the packet frequencies, as the first frequency F1 of the first signal LP. Accordingly, noise of the receive signal RS may be removed or reduced. Sensitivity may be improved by increasing the signal-to-noise ratio.

Accordingly, the electronic device 1000 with improved sensing reliability may be provided.

In the third graph GP3, one of the plurality of candidate frequencies V2-2 may be 150 kHz. In this case, the signal-to-noise ratio may have a value of 64.2 dB. When the electronic device is driven using the plurality of candidate frequencies V2-2, a signal-to-noise ratio may be determined to be normal because the signal-to-noise ratio is 40 dB or more.

Figure 13D:
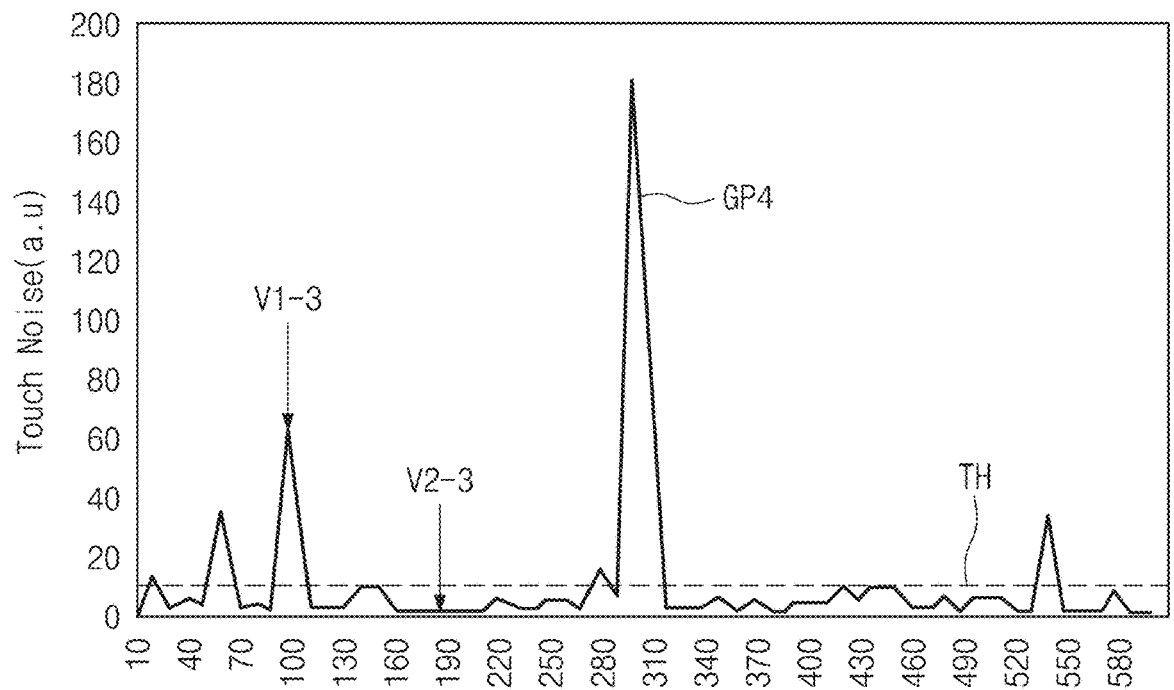
FIG. 13D is a graph illustrating noise for each packet frequency according to an embodiment of the present disclosure.

FIG. 13D is a graph illustrating noise for each packet frequency according to an embodiment of the present disclosure. In the following description made with reference to FIG. 13D, the same reference numerals will be assigned the same components described with reference to FIG. 13A, and the details thereof will be omitted.

Referring to FIGS. 2, 10, 11A, and 13D, the extracted noise for each packet frequency may be expressed in the form of a fourth graph GP4. The fourth graph GP4 illustrates noise for each packet frequency when the duty ratio of the first signal LP is 0.5 and the capacitance of the interference capacitor CC is 3000 fF.

Unlike the present disclosure, when the electronic device 1000 is driven based on the first signal LP having an interference frequency V1-3 having nose greater than predetermined threshold noise TH from among noise for each packet frequency, the noise caused by the interference capacitor CC may affect the analysis of the receive signal RS. However, according to the present disclosure, after sweeping the packet frequency of the data signal DATA and driving the sensor layer 200 to extract noise from the receive signal RS, the host processor 1001 may select, as the first frequency F1 of the first signal LP, one of a plurality of candidate frequencies V2-3 having a predetermined threshold noise TH or less from among the noise for the packet frequencies for driving. Accordingly, noise of the receive signal RS (see FIG. 10) may be removed or reduced. In addition, the SNR may be increased such that sensitivity is improved. Accordingly, the electronic device 1000 with improved reliability may be provided.

One of the plurality of candidate frequencies V2-3 in the fourth graph GP4 may be 180 kHz. In this case, the signal-to-noise ratio may have a value of 49.2 dB. When the electronic device is driven using the plurality of candidate frequencies V2-3, since the signal-to-noise ratio (SNR) is 40 dB or more, the SNR may be determined as being normal.

Figure 13E:
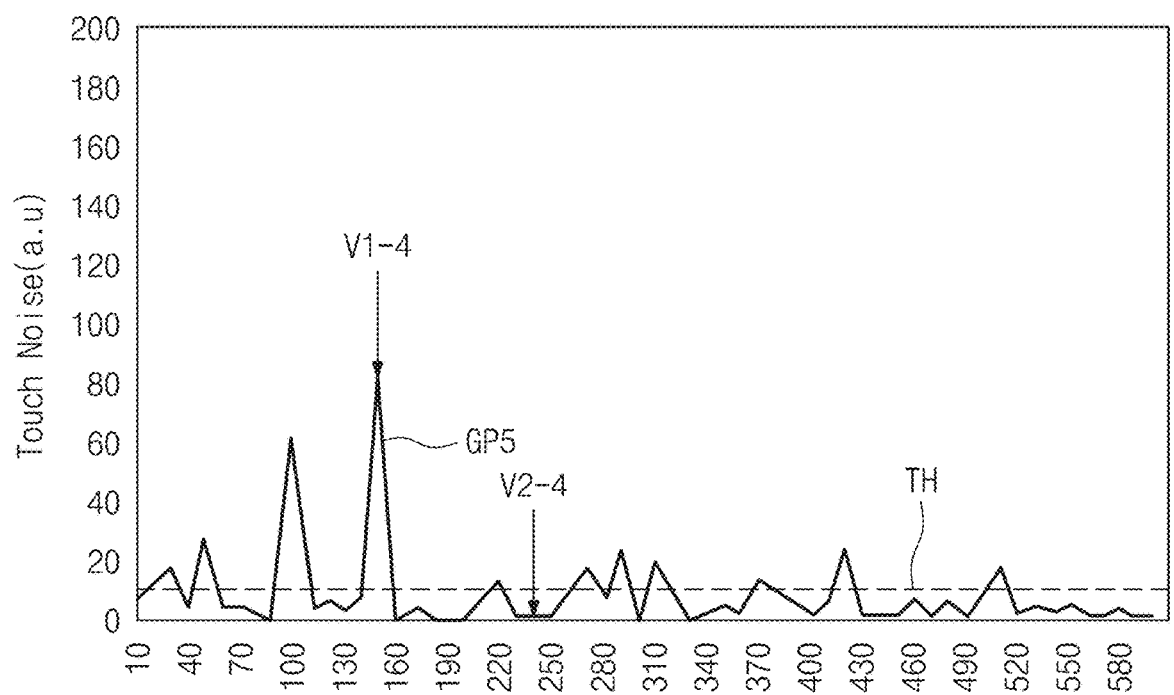
FIG. 13E is a graph illustrating noise for each packet frequency according to an embodiment of the present disclosure.

FIG. 13E is a graph illustrating noise for each packet frequency according to an embodiment of the present disclosure. In the following description made with reference to FIG. 13E, the same reference numerals will be assigned the same components described with reference to FIG. 13A, and the details thereof will be omitted.

Referring to FIGS. 2, 10, 11A, and 13E, the extracted noise for each packet frequency may be expressed through a fifth graph GP5. The fifth graph GP5 illustrates noise for each packet frequency when the duty ratio of the first signal LP is 0.25 and the capacitance of the interference capacitor CC is 3000 fF.

When a conventional electronic device is driven with the first signal LP having an interference noise V1-4 greater than a predetermined threshold noise TH from among noise for packet frequencies, noise caused by the interference capacitor CC may affect the analysis of the receive signal RS. However, according to the present disclosure, after sweeping the packet frequency of the data signal DATA and driving the sensor layer 200 to extract noise from the receive signal RS, the host processor 1001 may select one of a plurality of candidate frequencies V2-4 having the predetermined threshold noise TH or less from among noise for packet frequencies as the first frequency F1 of the first signal LP. Accordingly, noise of the receive signal RS may be removed or reduced. Sensitivity may be improved by increasing the signal-to-noise ratio. Accordingly, the electronic device 1000 with improved sensing reliability may be provided.

One of the plurality of candidate frequencies V2-4 in the fifth graph GP5 may be 160 kHz. In this case, the signal-to-noise ratio may have a value of 83.2 dB. When the electronic device is driven using the plurality of candidate frequencies V2-4, since the signal-to-noise ratio (SNR) is 40 dB or more, the SNR may be determined as being normal.

Figure 13F:
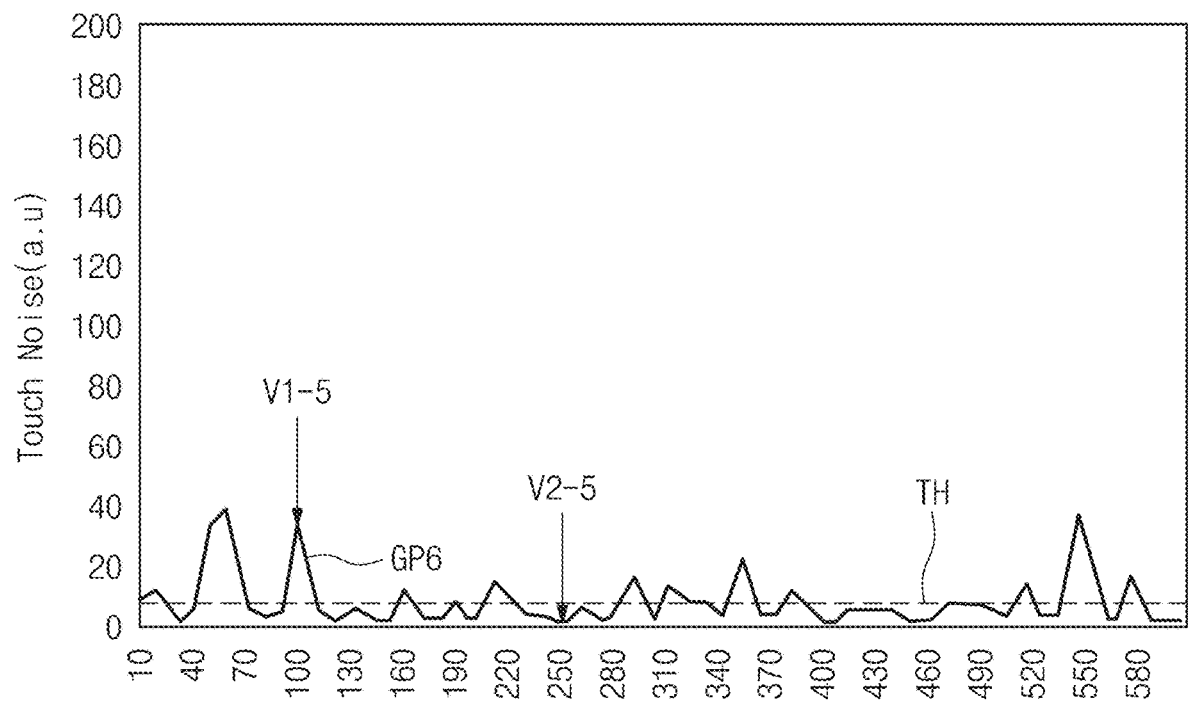
FIG. 13F is a graph illustrating noise for each packet frequency according to an embodiment of the present disclosure.

FIG. 13F is a graph illustrating noise for each packet frequency according to an embodiment of the present disclosure. In the following description made with reference to FIG. 13F, the same reference numerals will be assigned the same components described with reference to FIG. 13A, and the details thereof will be omitted.

Referring to FIGS. 2, 10, 11A, and 13F, the extracted noise for each packet frequency may be expressed through a sixth graph GP6. The sixth graph GP6 illustrates noise for each packet frequency when the duty ratio of the first signal LP is 0.125 and the capacitance of the interference capacitor CC is 3000 fF.

When a conventional electronic device is driven with the first signal LP having an interference frequency V1-5 greater than the predetermined threshold noise TH from among noise for packet frequencies, noise caused by the interference capacitor CC may affect the analysis of the receive signal RS. However, according to the present disclosure, after sweeping the packet frequency of the data signal DATA and driving the sensor layer 200 to extract noise from the receive signal RS, the host processor 1001 may select one of a plurality of candidate frequencies V2-5 having the predetermined threshold noise TH or less from among noise for the packet frequencies as the first frequency F1 of the first signal LP. Accordingly, noise of the receive signal RS may be removed or reduced. Sensitivity may be improved by increasing the signal-to-noise ratio. Accordingly, the electronic device 1000 with improved sensing reliability may be provided.

One of the plurality of candidate frequencies V2-5 in the sixth graph GP6 may be 150 kHz. In this case, the signal-to-noise ratio may have a value of 64.2 dB. When the electronic device is driven using any one of the plurality of candidate frequencies at which noise is below the threshold TH, such as the frequency V2-5, a signal-to-noise ratio may be determined to be normal because the signal-to-noise ratio is 40 dB or more.

As described above, one of the rising time point and the falling time point of the first period may be within one first transmit period. Accordingly, the rising component and the falling component of the first signal which is an interference signal routed through the interference capacitance, may be dependent on the first transmit period which is a specific sampling period. Noise due to the rising component and the falling component may cancel each other to be removed within the specific sampling period. In other words, noise may be reduced or removed. Sensitivity may be improved by increasing a signal to noise ratio (SNR). Accordingly, the electronic device with improved sensing reliability may be provided.

In addition, as described above, after sweeping the packet frequency of the data signal and driving the sensor layer to measure noise from the receive signal, the host processor may select, as the first frequency of the first signal, one of a plurality of candidate frequencies at which the measured noise level is less than or equal to a predetermined threshold. Accordingly, noise of the receive signal may be removed or reduced. Sensibility may be improved by increasing the SNR. Accordingly, the electronic device with improved reliability may be provided.

Although embodiments of the present disclosure have been described for illustrative purposes, those skilled in the art will appreciate that various modifications, and substitutions are possible, without departing from the scope and spirit of the inventive concept as disclosed in the accompanying claims. Accordingly, the technical scope of the present disclosure is not limited to the detailed description of this specification, but should be defined by the claims.

What is claimed is:

1. An electronic device comprising:
 a host processor configured to output a first signal having a first frequency and a second signal having a second frequency higher than the first frequency and containing frame data;
 a driving controller configured to receive the frame data from the host processor and to generate image data based on the frame data;
 a display layer configured to display an image based on the image data;
 a sensor layer disposed on the display layer and including a plurality of sensing electrodes; and
 a sensor driver configured to provide a transmit signal having a third frequency to the plurality of sensing electrodes,
 wherein the host processor determines the first frequency based on the third frequency.

2. The electronic device of claim 1, wherein the third frequency is an integer multiple of the first frequency.

3. The electronic device of claim 1, wherein the transmit signal includes:
 a first transmit period having a first level and a second transmit period subsequent to the first transmit period and having a second level lower than the first level, and
 wherein the first signal has a third level during a first period and a fourth level lower than the third level during a second period subsequent to the first period.

4. The electronic device of claim 3, wherein a width of the first transmit period and a width of the second transmit period are wider than a width of the first period.

5. The electronic device of claim 4, wherein the first transmit period completely overlaps the first period.

6. The electronic device of claim 4, wherein the second transmit period completely overlaps the first period.

7. The electronic device of claim 4, wherein the first frequency is equal to the third frequency.

8. The electronic device of claim 4, wherein the first frequency is higher than the third frequency.

9. The electronic device of claim 3, wherein a width of the first transmit period and a width of the second transmit period are each narrower than a width of the first period.

10. The electronic device of claim 9, wherein a plurality of first transmit periods are provided, and
 wherein two consecutive first transmit periods and the second transmit period interposed therebetween, collectively, completely overlap the first period.

11. The electronic device of claim 10, wherein a rising time point of the first period is within one of the two consecutive first transmit periods and a falling time point of the first period is within a remaining one of the two consecutive first transmit periods.

12. The electronic device of claim 9, wherein the first frequency is higher than the third frequency.

13. The electronic device of claim 1, further comprising:
 a connector electrically connecting the host processor to the display layer; and
 a first communication line electrically connected between the sensor driver and the connector to transmit driving information of the sensor layer.

14. The electronic device of claim 1, further comprising:
 a data driver electrically connected to the display layer; and
 a second communication line electrically connected between the sensor driver and the data driver to transmit driving information of the sensor layer.

15. The electronic device of claim 1, further comprising:
 a display signal line electrically connected to the display layer and the host processor to transmit or receive the first signal and the second signal; and
 a sensor signal line electrically connected between the sensor layer and the sensor driver to transmit or receive the transmit signal,
 wherein the display signal line and the sensor signal line overlap each other when viewed in a plan view.

16. An electronic device comprising:
 a host processor configured to output a first signal having a first frequency and a second signal having a second frequency higher than the first frequency and containing frame data;
 a driving controller configured to receive the frame data from the host processor and to generate image data based on the frame data;
 a display layer configured to display an image based on the image data;
 a sensor layer disposed on the display layer and including a plurality of sensing electrodes; and
 a sensor driver configured to provide a transmit signal to the plurality of sensing electrodes and to receive a receive signal from the plurality of sensing electrodes,
 wherein the host processor measures noise in the receive signal by sweeping a packet frequency over a range of packet frequencies and driving the sensor layer, and
 wherein the host processor selects, as the first frequency, one of a plurality of candidate frequencies at which the measured noise is equal to or below a predetermined threshold.

17. The electronic device of claim 16, wherein the host processor includes:
 a memory to store a value of the measured noise at each packet frequency.

18. The electronic device of claim 16, wherein a noise of the predetermined threshold level is preset based on an erroneous operation of the sensor layer.

19. The electronic device of claim 16, wherein the host processor outputs the first signal having the first frequency selected.

20. The electronic device of claim 16, wherein the host processor re-measures the noise for each packet frequency, when the sensor driver is reset.

21. An electronic device comprising:
 a host processor configured to output a first signal having a first frequency and a second signal having a second frequency higher than the first frequency and containing frame data;
 a driving controller configured to receive the frame data from the host processor and to generate image signal based on the frame data;
 a display layer to receive the image signal;

a sensor layer disposed on the display layer and including a plurality of sensing electrodes; and a sensor driver configured to provide a transmit signal having a third frequency to the plurality of sensing electrodes and to receive a receive signal from the plurality of sensing electrodes, wherein an active period of the transmit signal completely overlaps an active period of the first signal.

22. The electronic device of claim 21, wherein a width of the active period of the transmit signal is wider than a width of the active period of the first signal.

23. The electronic device of claim 21, wherein the first frequency is equal to or higher than the third frequency.

24. The electronic device of claim 21, further comprising:
a connector electrically connecting the host processor to the display layer; and
a first communication line electrically connected between the sensor driver and the connector to transmit driving information of the sensor layer.

25. The electronic device of claim 21, further comprising:
a second communication line electrically connected between the sensor driver and the driving controller to transmit driving information of the sensor layer.

* * * * *